United States Patent
Jen et al.

(10) Patent No.: US 9,921,768 B2
(45) Date of Patent: Mar. 20, 2018

(54) LOW POWER ENTRY IN A SHARED MEMORY LINK

(71) Applicant: Intel Corporation, Santa Clara, CA (US)

(72) Inventors: Michelle C. Jen, Sunnyvale, CA (US); Debendra Das Sharma, Saratoga, CA (US); Mahesh Wagh, Portland, OR (US); Venkatraman Iyer, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/576,125

(22) Filed: Dec. 18, 2014

(65) Prior Publication Data
US 2016/0179427 A1    Jun. 23, 2016

(51) Int. Cl.
G06F 3/06       (2006.01)
G06F 13/38      (2006.01)
G06F 1/32       (2006.01)

(52) U.S. Cl.
CPC .......... *G06F 3/0625* (2013.01); *G06F 1/3234* (2013.01); *G06F 3/0659* (2013.01); *G06F 3/0673* (2013.01); *G06F 13/385* (2013.01)

(58) Field of Classification Search
CPC .... G06F 3/0625; G06F 3/0659; G06F 3/0673; G06F 13/387; G06F 13/4265; G06F 13/4282
See application file for complete search history.

(56) References Cited

U.S. PATENT DOCUMENTS

| | | | | |
|---|---|---|---|---|
| 8,340,111 B1* | 12/2012 | Krivitski | ................ | H04L 12/12 370/419 |
| 8,446,903 B1* | 5/2013 | Ranganathan | ........ | H04L 49/109 370/359 |
| 2001/0031626 A1* | 10/2001 | Lindskog | .............. | G06F 1/3203 455/67.13 |
| 2002/0165975 A1* | 11/2002 | Abbott | ................... | H04L 29/06 709/230 |
| 2006/0053240 A1* | 3/2006 | Chappell | ............. | H04L 49/9047 710/240 |
| 2009/0119421 A1* | 5/2009 | Souders | ............ | H04L 12/40078 710/10 |
| 2009/0300245 A1* | 12/2009 | Shoemaker | ........... | G06F 13/385 710/105 |

(Continued)

OTHER PUBLICATIONS

European Extended Search Report dated May 6, 2016 in European Application No. EP15194805.6).

(Continued)

*Primary Examiner* — Hal Schnee
(74) *Attorney, Agent, or Firm* — Alliance IP, LLC

(57) ABSTRACT

Data is sent to correspond to a load/store-type operation associated with shared memory over a link according to a memory access link protocol and the memory access link protocol is to be overlaid on another, different link protocol. A request is sent to enter a low power state, where the request is to include a data value encoded in a field of a token, the token is to indicate a start of packet data and is to further indicate whether subsequent data to be sent after the token is to include data according to one of the other link protocol and the memory access link protocol.

18 Claims, 14 Drawing Sheets

(56) References Cited

U.S. PATENT DOCUMENTS

| | | | |
|---|---|---|---|
| 2010/0229015 A1* | 9/2010 | Hebron | H04L 12/10 713/323 |
| 2011/0072234 A1 | 3/2011 | Chinya et al. | |
| 2013/0166798 A1 | 6/2013 | Chandra et al. | |
| 2014/0006670 A1* | 1/2014 | Wagh | G06F 13/4027 710/305 |
| 2014/0112339 A1* | 4/2014 | Safranek | G06F 12/0831 370/389 |

OTHER PUBLICATIONS

Japanese Notice of Reasons for Rejection in Japanese Patent Application No. 2015-218678 dated Nov. 15, 2016.
Taiwan Official Letter and Search Report in Taiwan Patent Application No. 104136491 dated Oct. 21, 2016.
Taiwan Official Letter and Search Report in Taiwan Patent Application No. 104136491 dated Mar. 16, 2016.
Korean Notice of Preliminary Rejection in Korean Patent Application No. 2015-0160900 dated Mar. 13, 2017.

* cited by examiner

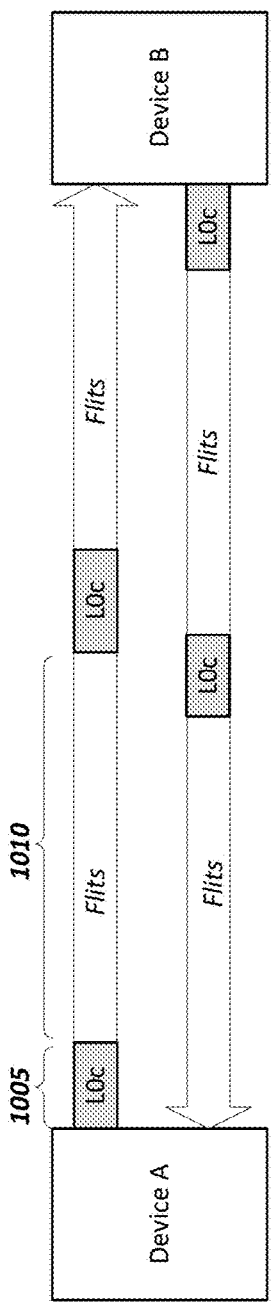
FIG. 10
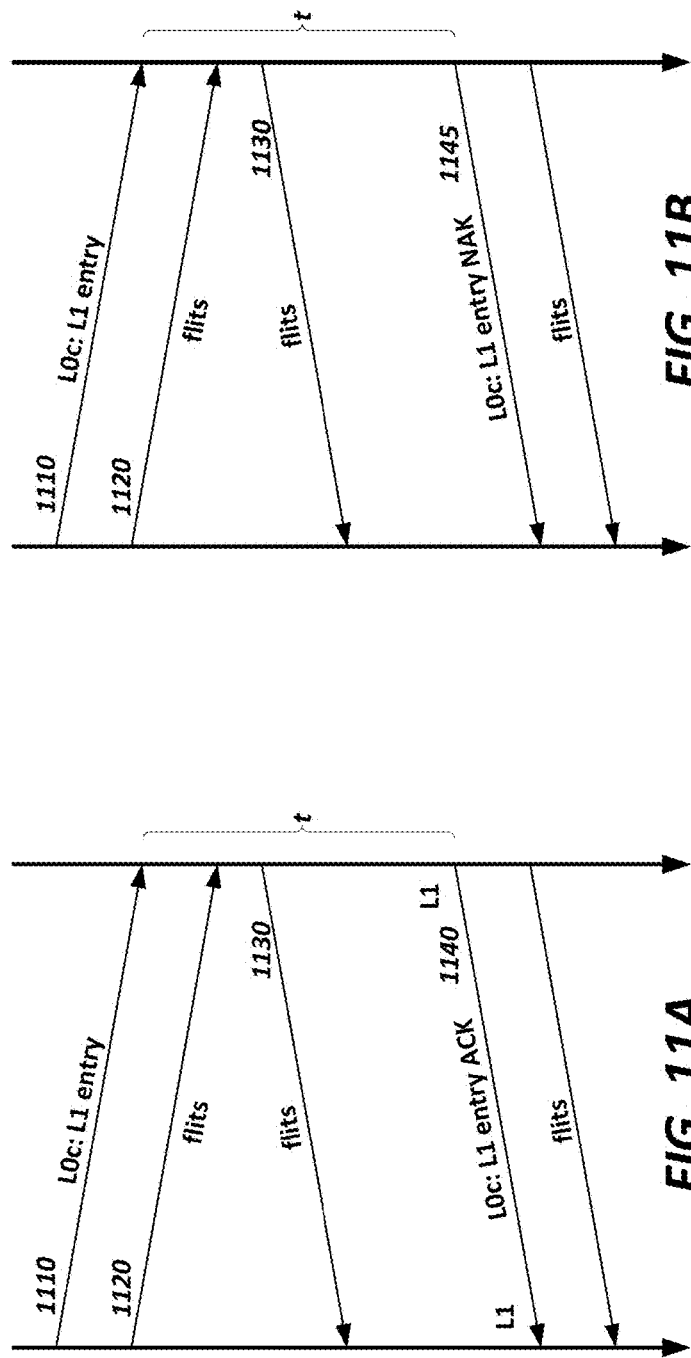
FIG. 11A
FIG. 11B

LOW POWER ENTRY IN A SHARED MEMORY LINK

FIELD

This disclosure pertains to computing systems, and in particular (but not exclusively) to memory access between components in a computing system.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE DRAWINGS

FIG. 10 illustrates a representation of an example control window embedded in a data stream.

FIGS. 11A-11B illustrate flow diagrams of example handshakes utilizing embedded control windows.

Like reference numbers and designations in the various drawings indicate like elements.

DETAILED DESCRIPTION

Figure 1:
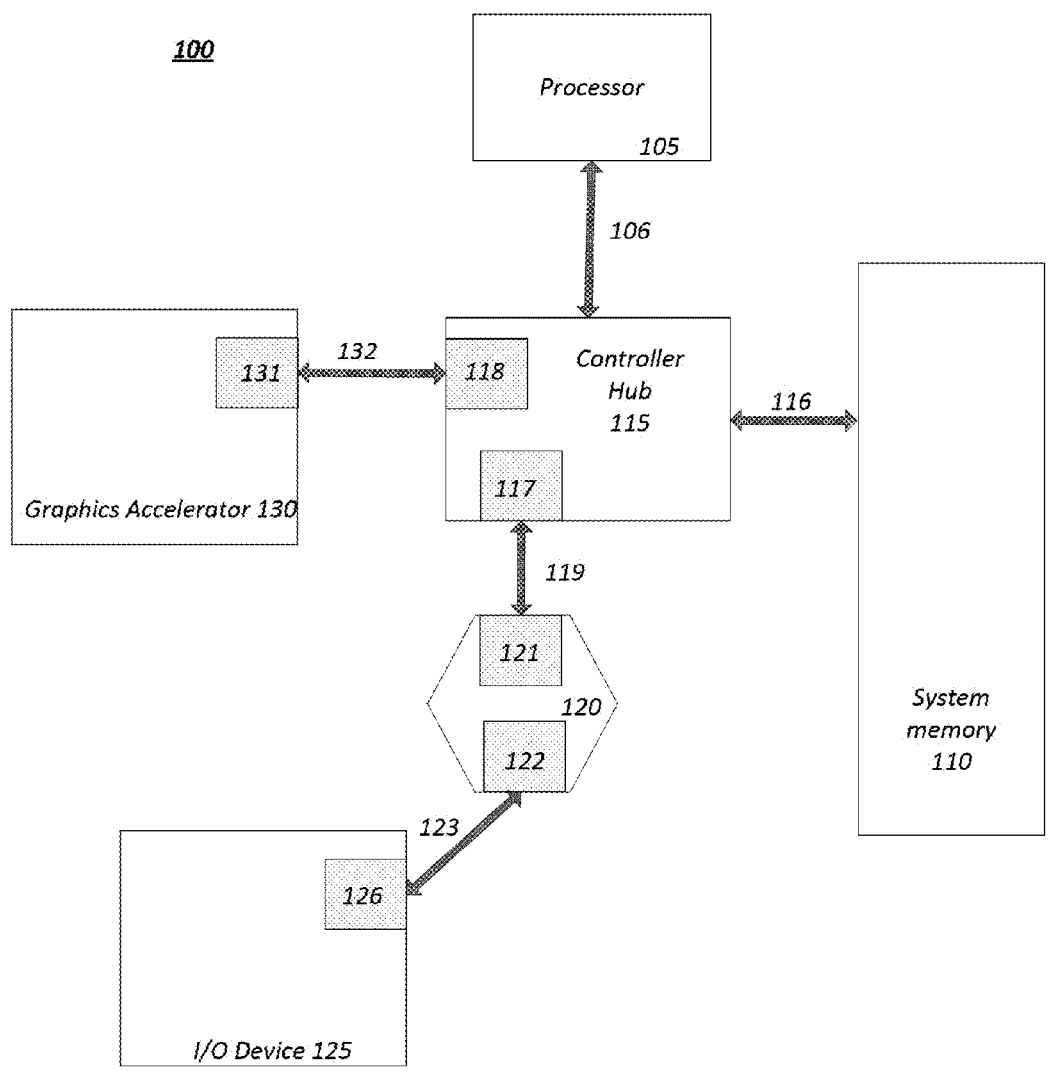
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
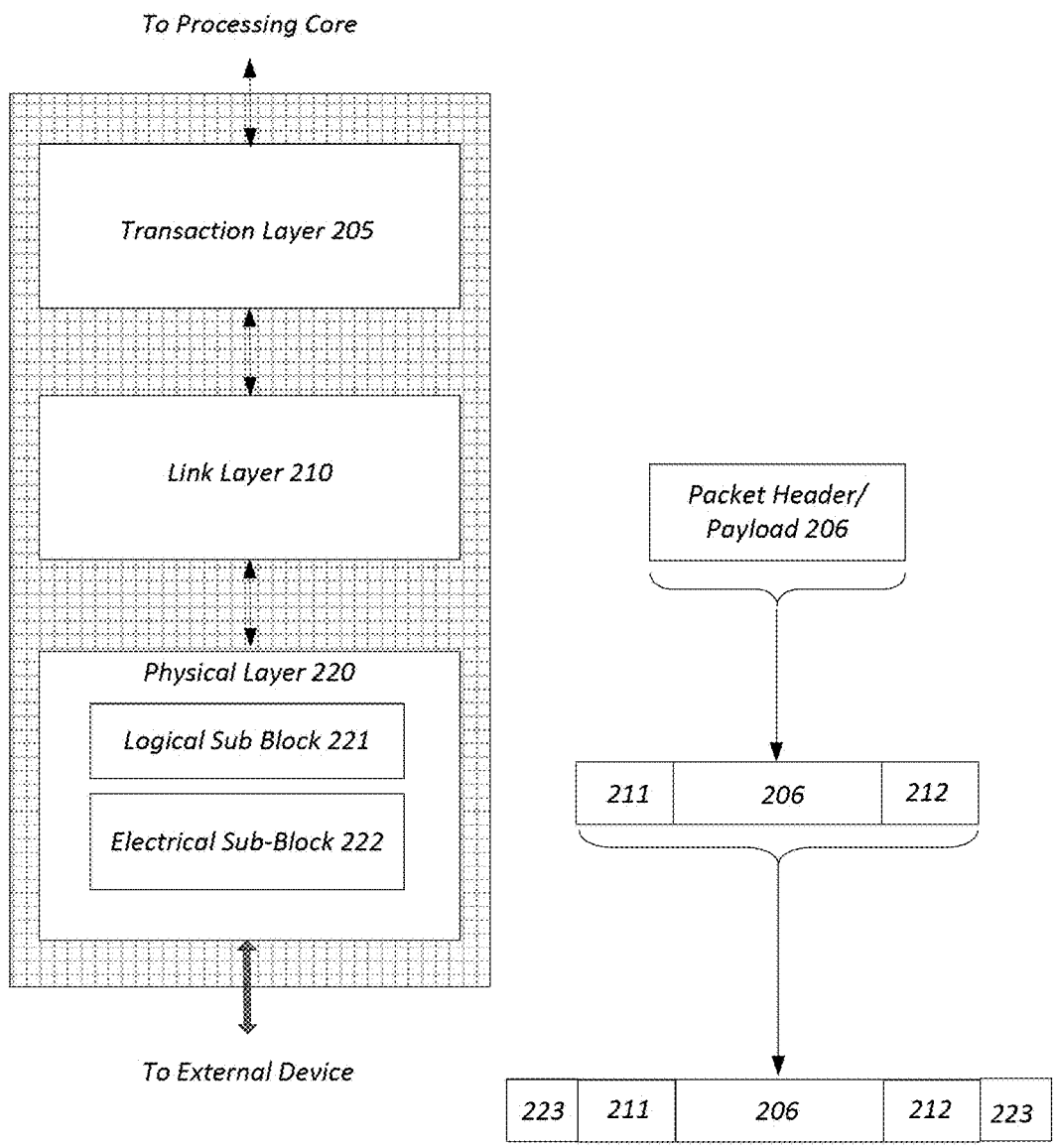
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCie stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Figures 3, 4:
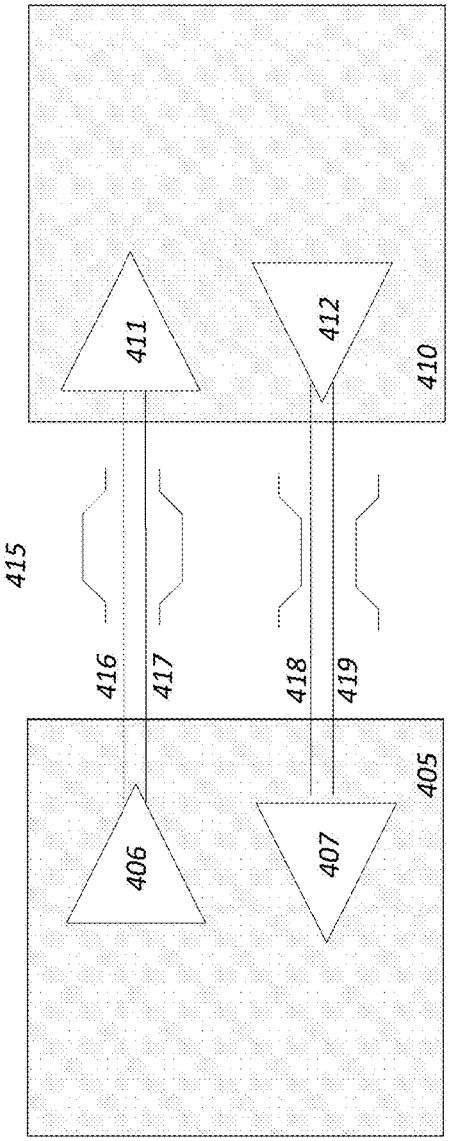
FIG. 3 illustrates an embodiment of a request or packet to be generated or received within an interconnect architecture.
FIG. 4 illustrates an embodiment of a transmitter and receiver pair for an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes:

(1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. crosscoupling, voltage overshoot/undershoot, ringing, etc. This allows for better timing window, which enables faster transmission frequencies.

Physical layers of existing interconnect and communication architectures, including PCIe, can be leveraged to provide shared memory and I/O services within a system. Traditionally, cacheable memory cannot be shared between independent systems using traditional load/store (LD/ST) memory semantics. An independent system, or "node", can be independent in the sense that it functions as a single logical entity, is controlled by a single operating system (and/or single BIOS or Virtual Machine Monitor (VMM)), and/or has an independent fault domain. A single node can include one or multiple processor devices, be implemented on a single board or multiple boards, and include local memory, including cacheable memory that can be accessed using LD/ST semantics by the devices on the same node. Within a node, shared memory can include one or more blocks of memory, such as a random access memory (RAM), that can be accessed by several different processors (e.g., central processing units (CPUs)) within a node. Shared memory can also include the local memory of the processors or other devices in the node. The multiple devices within a node having shared memory can share a single view of data within the shared memory. I/O communication involving shared memory can be very low latency and allow quick access to the memory by the multiple processors.

Traditionally, memory sharing between different nodes has not allowed memory sharing according to a load/store paradigm. For instance, in some systems, memory sharing between different nodes has been facilitated through distributed memory architectures. In traditional solutions, computational tasks operate on local data, and if data of another node is desired, the computational task (e.g., executed by another CPU node) communicates with the other node, for instance, over a communication channel utilizing a communication protocol stack, such as Ethernet, InfiniBand, or another layered protocol. In traditional multi-node systems, the processors of different nodes do not have to be aware where data resides. Sharing data using traditional approaches, such as over a protocol stack, can have a significantly higher latency than memory sharing within a node using a load/store paradigm. Rather than directly addressing and operating on data in shared memory, one node can request data from another using an existing protocol handshake such as Ethernet (or Infiniband), and the source node can provide the data, such that the data can be stored and operated on by the requesting node, among other examples.

In some implementations, a shared memory architecture can be provided that allows memory to be shared between independent nodes for exclusive or shared access using load/store (LD/ST) memory semantics. In one example, memory semantics (and directory information, if applicable) along with I/O semantics (for protocols such as PCIe) can be exported on either a common set of pins or a separate set of pins. In such a system, the improved shared memory architecture can each of a plurality of nodes in a system to maintain its own independent fault domain (and local memory), while enabling a shared memory pool for access by the nodes and low-latency message passing between nodes using memory according to LD/ST semantics. In some implementations, such a shared memory pool can be dynamically (or statically) allocated between different nodes. Accordingly, one can also configure the various nodes of a system into dynamically changing groups of nodes to work cooperatively and flexibly on various tasks making use of the shared memory infrastructure, for instance, as demand arises.

Figure 5:
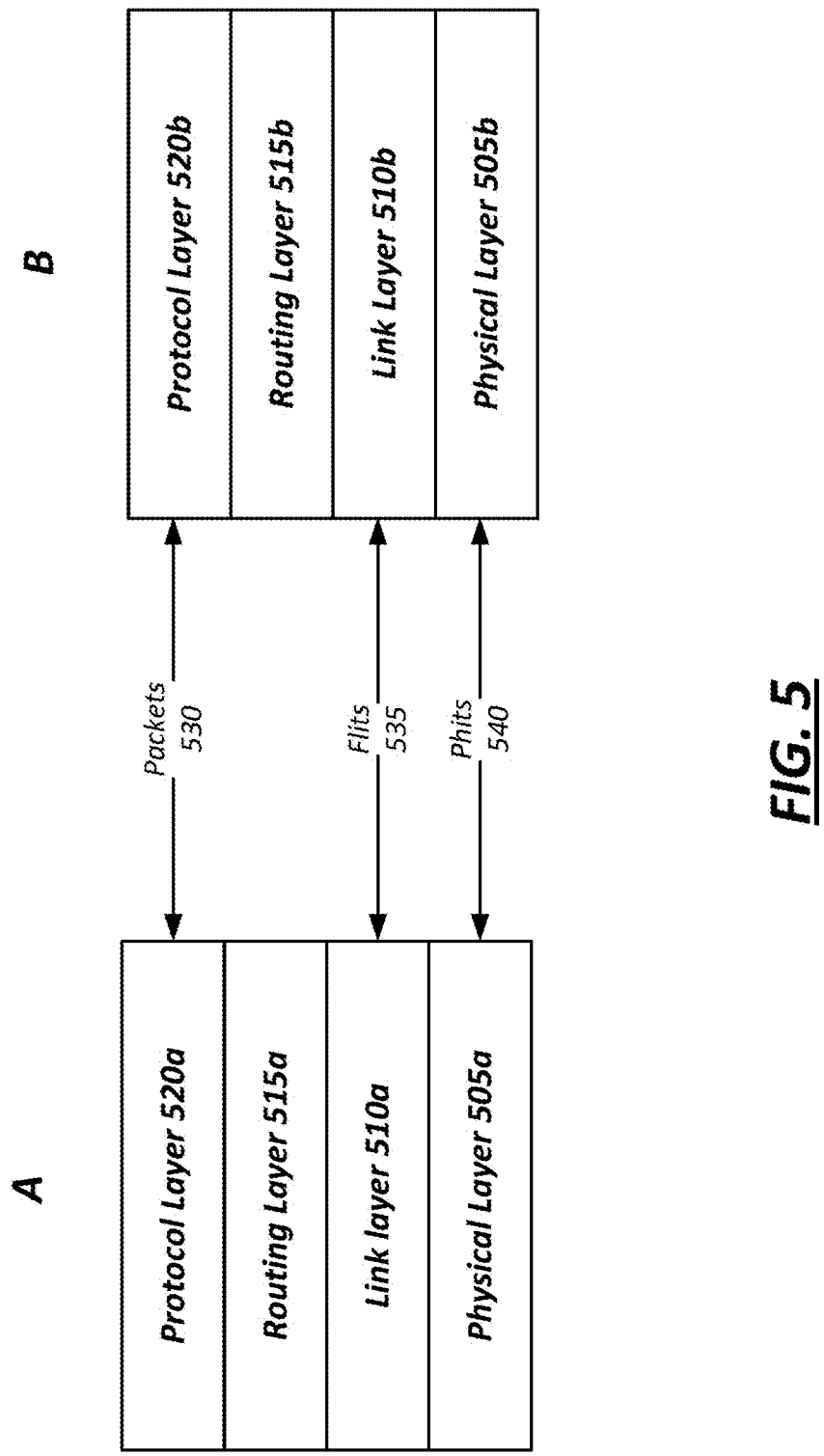
FIG. 5 illustrates an example layered protocol stack of an interconnect.

In one embodiment, an interconnect can provided in high performance computing platforms, such as workstations or servers, to connect processors, accelerators, computing blocks, I/O devices, and the like. An interconnect architecture can be layered to include defined layers such as, protocol layers (coherent, non-coherent, and, optionally, other memory based protocols), a routing layer, a link layer, and a physical layer. FIG. 5 illustrates an embodiment of an example layered protocol stack of an interconnect. In some implementations, at least some of the layers illustrated in FIG. 5 may be optional. Each layer deals with its own level of granularity or quantum of information (the protocol layer 505*a,b* with packets 530, link layer 510*a,b* with flits 535, and physical layer 505*a,b* with phits 540). Note that a packet, in some embodiments, may include partial flits, a single flit, or multiple flits based on the implementation.

As a first example, a width of a phit 540 includes a 1 to 1 mapping of link width to bits (e.g. 20 bit link width includes a phit of 20 bits, etc.). Flits may have a greater size, such as 184, 192, or 200 bits. Note that if phit 540 is 20 bits wide and the size of flit 535 is 184 bits then it takes a fractional number of phits 540 to transmit one flit 535 (e.g. 9.2 phits at 20 bits to transmit an 184 bit flit 535 or 9.6 at 20 bits to transmit a 192 bit flit, among other examples). Note that widths of the fundamental link at the physical layer may vary. For example, the number of lanes per direction may include 2, 4, 6, 8, 10, 12, 14, 16, 18, 20, 22, 24, etc. In one embodiment, link layer 510*a,b* is capable of embedding multiple pieces of different transactions in a single flit, and one or multiple headers (e.g. 1, 2, 3, 4) may be embedded within the flit. In one example, the headers may be split into corresponding slots to enable multiple messages in the flit destined for different nodes.

Physical layer 505a,b, in one embodiment, can be responsible for the fast transfer of information on the physical medium (electrical or optical etc.). The physical link can be point-to-point between two Link layer entities, such as layer 505a and 505b. The Link layer 510a,b can abstract the Physical layer 505a,b from the upper layers and provides the capability to reliably transfer data (as well as requests) and manage flow control between two directly connected entities. The Link Layer can also be responsible for virtualizing the physical channel into multiple virtual channels and message classes. The Protocol layer 520a,b relies on the Link layer 510a,b to map protocol messages into the appropriate message classes and virtual channels before handing them to the Physical layer 505a,b for transfer across the physical links. Link layer 510a,b may support multiple messages, such as a request, snoop, response, writeback, non-coherent data, among other examples.

A Physical layer 505a,b (or PHY) can be defined to be implemented above the electrical layer (i.e. electrical conductors connecting two components) and below the link layer 510a,b, as illustrated in FIG. 5. The Physical layer and corresponding logic can reside on each agent and connects the link layers on two agents (A and B) separated from each other (e.g. on devices on either side of a link). The local and remote electrical layers are connected by physical media (e.g. wires, conductors, optical, etc.). The Physical layer 505a,b, in one embodiment, has two major phases, initialization and operation. During initialization, the connection is opaque to the link layer and signaling may involve a combination of timed states and handshake events. During operation, the connection is transparent to the link layer and signaling is at a speed, with all lanes operating together as a single link. During the operation phase, the Physical layer transports flits from agent A to agent B and from agent B to agent A. The connection is also referred to as a link and abstracts some physical aspects including media, width and speed from the link layers while exchanging flits and control/status of current configuration (e.g. width) with the link layer. The initialization phase includes minor phases e.g. Polling, Configuration. The operation phase also includes minor phases (e.g. link power management states).

In one embodiment, Link layer 510a,b can be implemented so as to provide reliable data transfer between two protocol or routing entities. The Link layer can abstract Physical layer 505a,b from the Protocol layer 520a,b, and can be responsible for the flow control between two protocol agents (A, B), and provide virtual channel services to the Protocol layer (Message Classes) and Routing layer (Virtual Networks). The interface between the Protocol layer 520a,b and the Link Layer 510a,b can typically be at the packet level. In one embodiment, the smallest transfer unit at the Link Layer is referred to as a flit which a specified number of bits, such as 192 bits or some other denomination. The Link Layer 510a,b relies on the Physical layer 505a,b to frame the Physical layer's 505a,b unit of transfer (phit) into the Link Layer's 510a,b unit of transfer (flit). In addition, the Link Layer 510a,b may be logically broken into two parts, a sender and a receiver. A sender/receiver pair on one entity may be connected to a receiver/sender pair on another entity. Flow Control is often performed on both a flit and a packet basis. Error detection and correction is also potentially performed on a flit level basis.

In one embodiment, Routing layer 515a,b can provide a flexible and distributed method to route transactions from a source to a destination. The scheme is flexible since routing algorithms for multiple topologies may be specified through programmable routing tables at each router (the programming in one embodiment is performed by firmware, software, or a combination thereof). The routing functionality may be distributed; the routing may be done through a series of routing steps, with each routing step being defined through a lookup of a table at either the source, intermediate, or destination routers. The lookup at a source may be used to inject a packet into the fabric. The lookup at an intermediate router may be used to route a packet from an input port to an output port. The lookup at a destination port may be used to target the destination protocol agent. Note that the Routing layer, in some implementations, can be thin since the routing tables, and, hence the routing algorithms, are not specifically defined by specification. This allows for flexibility and a variety of usage models, including flexible platform architectural topologies to be defined by the system implementation. The Routing layer 515a,b relies on the Link layer 510a,b for providing the use of up to three (or more) virtual networks (VNs)—in one example, two deadlock-free VNs, VN0 and VN1 with several message classes defined in each virtual network. A shared adaptive virtual network (VNA) may be defined in the Link layer, but this adaptive network may not be exposed directly in routing concepts, since each message class and virtual network may have dedicated resources and guaranteed forward progress, among other features and examples.

In one embodiment, an interconnect architecture can include a Coherence Protocol layer 520a,b to support agents caching lines of data from memory. An agent wishing to cache memory data may use the coherence protocol to read the line of data to load into its cache. An agent wishing to modify a line of data in its cache may use the coherence protocol to acquire ownership of the line before modifying the data. After modifying a line, an agent may follow protocol requirements of keeping it in its cache until it either writes the line back to memory or includes the line in a response to an external request. Lastly, an agent may fulfill external requests to invalidate a line in its cache. The protocol ensures coherency of the data by dictating the rules all caching agents may follow. It also provides the means for agents without caches to coherently read and write memory data.

Two conditions may be enforced to support transactions utilizing an example Coherence Protocol. First, the protocol can maintain data consistency, as an example, on a per-address basis, among data in agents' caches and between those data and the data in memory. Informally, data consistency may refer to each valid line of data in an agent's cache representing a most up-to-date value of the data and data transmitted in a coherence protocol packet can represent the most up-to-date value of the data at the time it was sent. When no valid copy of the data exists in caches or in transmission, the protocol may ensure the most up-to-date value of the data resides in memory. Second, the protocol can provide well-defined commitment points for requests. Commitment points for reads may indicate when the data is usable; and for writes they may indicate when the written data is globally observable and will be loaded by subsequent reads. The protocol may support these commitment points for both cacheable and uncacheable (UC) requests in the coherent memory space.

In some implementations, an interconnect can utilize an embedded clock. A clock signal can be embedded in data transmitted using the interconnect. With the clock signal embedded in the data, distinct and dedicated clock lanes can be omitted. This can be useful, for instance, as it can allow more pins of a device to be dedicated to data transfer, particularly in systems where space for pins is at a premium.

A link can be established between two agents on either side of an interconnect. An agent sending data can be a local agent and the agent receiving the data can be a remote agent. State machines can be employed by both agents to manage various aspects of the link. In one embodiment, the Physical layer data path can transmit flits from the link layer to the electrical front-end. The control path, in one implementation, includes a state machine (also referred to as a link training state machine or the similar). The state machine's actions and exits from states may depend on internal signals, timers, external signals or other information. In fact, some of the states, such as a few initialization states, may have timers to provide a timeout value to exit a state. Note that detect, in some embodiments, refers to detecting an event on both legs of a lane; but not necessarily simultaneously.

States defined in the state machine can include reset states, initialization states, and operational states, among other categories and subcategories. Actions and exits, in one embodiment, can be based on exchange of training sequences. In one embodiment, the link state machine is to run in the local agent clock domain and transition from one state to the next is to coincide with a transmitter training sequence boundary. Status registers may be utilized to reflect the current state. Example, states may include, for instance:

Transmitting Link State:

a link state. Flits are sent to a remote agent. State may be entered from a blocking link state and may return to a blocking link state on an event, such as a timeout. Transmitter transmits flits and receiver receives flits during the transmitting link state (TLS). May also exit to a low power link state from TLS. In some implementations, TLS can be referred to as the "L0" state.

Blocking Link State:

a link state. Transmitter and receiver are operating in a unified manner. May be a timed state during which the link layer flits are held off while the Physical layer information is communicated to the remote agent. May exit to a low power link state (or other link state based on the design). A blocking link state (BLS), in one embodiment, may occur periodically. The period can be referred to as a BLS interval and may be timed, and can differ between slow speed and operational speed. Note that the link layer may be periodically blocked from sending flits so that a Physical layer control sequence of a length may be sent, such as during a transmitting link state or a partial width transmitting link state. In some implementations, blocking link state (BLS) can be referred to as a L0 control, or "L0c", state.

Partial Width Transmitting Link State:

a power-saving link state. In one embodiment asymmetric partial width refers to each direction of a two direction link having different widths, which may be supported in some designs. While speed may not be altered in a partial width state, the width of the lanes of the link may be. Therefore, flits are potentially sent at different widths. The partial width state may exit to other link states, such as a low power link state based on certain received and sent messages or an exit of the partial width transmitting link state or a link blocking state based on other events. In one embodiment, a transmitter port may turn idle lanes off in a staggered manner to provide better signal integrity (i.e. noise mitigation). Non-retry-able flits, such as Null flits, may be utilized during periods where the link width is changing. A corresponding receiver may drop these null flits and turn idle lanes off in a staggered manner, as well as record the current and previous lane maps in one or more structures. Note status and associated status register may remain unaltered. In some implementations, partial width transmitting link state can be referred to as a partial L0, or L0p, state.

Exit Partial Width Transmitting Link State:

exit the partial width state. May or may not use a blocking link state in some implementations. The transmitter initiates exit, in one embodiment, by sending partial width exit patterns on the idle lanes to train and deskew them. As one example, an exit pattern starts with EIEOS, which is detected and debounced to signal that the lane is ready to start the entry to a full transmitting link state, and may end with SDS or Fast Training Sequence (FTS) on idle lanes. Any failure during the exit sequence (receiver actions, such as deskew not completed prior to timeout) stops flit transfers to the link layer and asserts a reset, which is handled by resetting the link on the next blocking link state occurrence. The SDS may also initialize the scrambler/descrambler on the lanes to appropriate values.

Low Power Link State:

is a lower power state. In one embodiment, it is lower power than the partial width link state, since signaling in this embodiment is stopped on all lanes and in both directions. Transmitters may use a blocking link state for requesting a low power link state. Here, receiver may decode the request and respond with an ACK or a NAK; otherwise reset may be triggered. In some implementations, low power link state can be referred to as a L1 state.

Figure 6:
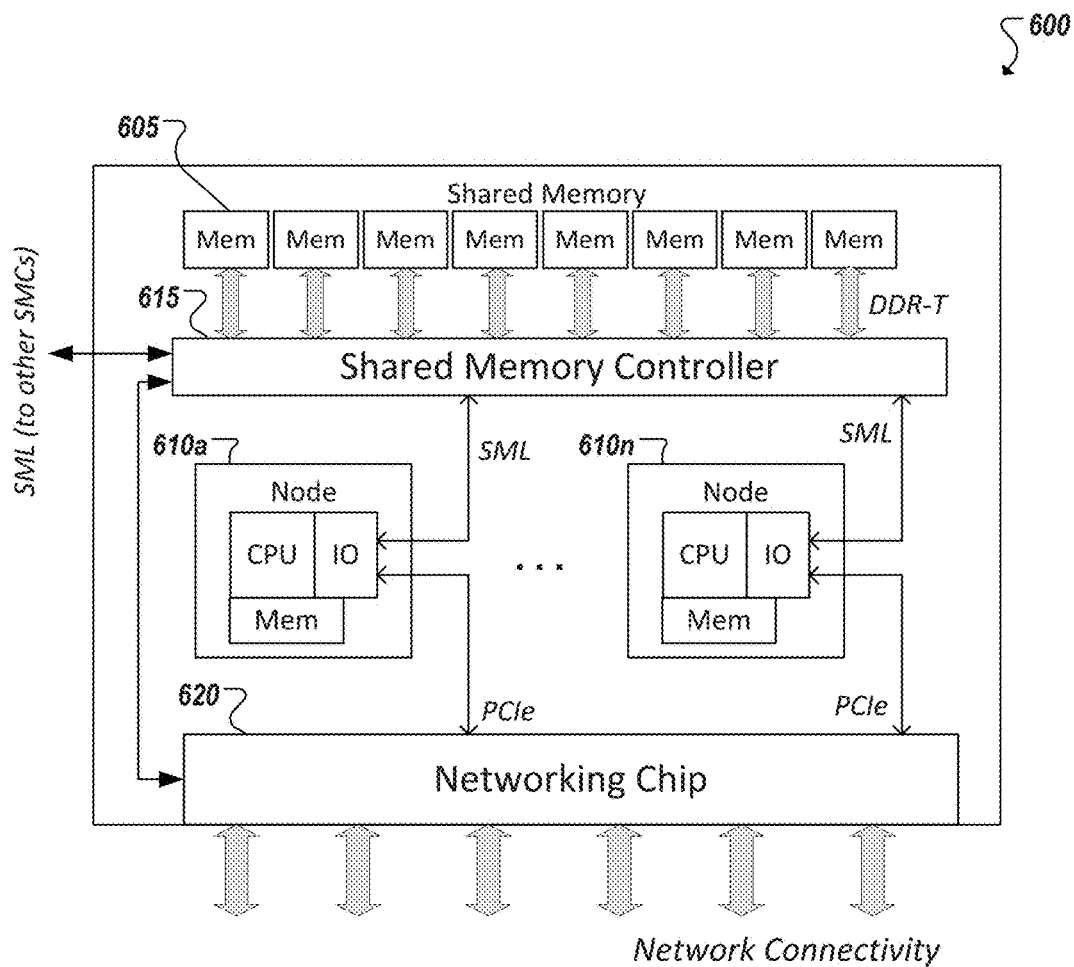
FIG. 6 illustrates a simplified block diagram of an embodiment of an example node.

Turning to FIG. 6, a simplified block diagram 600 is shown illustrating an example system including shared memory 605 capable of being accessed using load/store techniques by each of a plurality of independent nodes 610a-610n. For instance, a shared memory controller 615 can be provided that can accept load/store access requests of the various nodes 610a-610n on the system. Shared memory 605 can be implemented utilizing synchronous dynamic random access memory (SDRAM), dual in-line memory modules (DIMM), and other non-volatile memory (or volatile memory).

Each node may itself have one or multiple CPU sockets and may also include local memory that remains insulated from LD/ST access by other nodes in the system. The node can communicate with other devices on the system (e.g., shared memory controller 615, networking controller 620, other nodes, etc.) using one or more protocols, including PCIe, QPI, Ethernet, among other examples. In some implementations, a shared memory link (SML) protocol can be provided through which low latency LD/ST memory semantics can be supported. SML can be used, for instance, in communicating reads and writes of shared memory 605 (through shared memory controller 615) by the various nodes 610a-610n of a system. In some implementations, SML can adopt aspects of the interconnect architecture and protocol described in connection with the example of FIG. 5.

In one example, SML can be based on a memory access protocol, such as Scalable Memory Interconnect (SMI) 3rd generation (SMI3). Other memory access protocols can be alternatively used, such as transactional memory access protocols such as fully buffered DIMM (FB-DIMM), DDR Transactional (DDR-T), among other examples. In other instances, SML can be based on native PCIe memory read/write semantics with additional directory extensions. A memory-protocol-based implementation of SML can offer bandwidth efficiency advantages due to being tailored to cache line memory accesses. While high performance inter-device communication protocols exist, such as PCIe, upper layers (e.g., transaction and link layers) of such protocols can introduce latency that degrades application of the full protocol for use in LD/ST memory transactions, including transactions involving a shared memory 605. A memory link protocol, such as SMI3, can allow a potential additional advantage of offering lower latency accesses since it can bypass most of another protocol stack, such as PCIe. Accordingly, implementations of SML can utilize SMI3 or another memory protocol running on a logical and physical PHY of another protocol, such as SMI3 on PCIe.

As noted, in some implementations, a shared memory controller (SMC) 615 can be provided that includes logic for handling load/store requests of nodes 610a-610n in the system. Load/store requests can be received by the SMC 615 over links utilizing SML and connecting the nodes 610a-610n to the SMC 615. In some implementations the SMC 615 can be implemented as a device, such as an application-specific integrated circuit (ASIC), including logic for servicing the access requests of the nodes 610a-610n for shared memory resources. In other instances, the SMC 615 (as well as shared memory 605) can reside on a device, chip, or board separate from one or more (or even all) of the nodes 610a-610n. The SMC 615 can further include logic to coordinate various nodes' transactions that involve shared memory 605. Additionally, the SMC can maintain a directory tracking access to various data resources, such as each cache line, included in shared memory 605. For instance, a data resource can be in a shared access state (e.g., capable of being accessed (e.g., loaded or read) by multiple processing and/or I/O devices within a node, simultaneously), an exclusive access state (e.g., reserved exclusively, if not temporarily, by a single processing and/or I/O device within a node (e.g., for a store or write operation), an uncached state, among other potential examples. Further, while each node may have direct access to one or more portions of shared memory 605, different addressing schemes and values may be employed by the various nodes (e.g., 610a-610n) resulting in the same shared memory data being referred to (e.g., in an instruction) by a first node according to a first address value and a second node being referring to the same data by a second address value. The SMC 615 can include logic, including data structures mapping nodes' addresses to shared memory resources, to allow the SMC 615 to interpret the various access requests of the various nodes.

Additionally, in some cases, some portion of shared memory (e.g., certain partitions, memory blocks, records, files, etc.) may be subject to certain permissions, rules, and assignments such that only a portion of the nodes 610a-610n are allowed (e.g., by the SMC 615) to access the corresponding data. Indeed, each shared memory resource may be assigned to a respective (and in some cases different) subset of the nodes 610a-610n of the system. These assignments can be dynamic and SMC 615 can modify such rules and permissions (e.g., on-demand, dynamically, etc.) to accommodate new or changed rules, permissions, node assignments and ownership applicable to a given portion of the shared memory 605.

An example SMC 615 can further track various transactions involving nodes (e.g., 610a-610n) in the system accessing one or more shared memory resources. For instance, SMC 615 can track information for each shared memory 605 transaction, including identification of the node(s) involved in the transaction, progress of the transaction (e.g., whether it has been completed), among other transaction information. This can permit some of the transaction-oriented aspects of traditional distributed memory architectures to be applied to the improved multi-node shared memory architecture described herein. Additionally, transaction tracking (e.g., by the SMC) can be used to assist in maintaining or enforcing the distinct and independent fault domains of each respective node. For instance, the SMC can maintain the corresponding Node ID for each transaction-in-progress in its internal data structures, including in memory, and use that information to enforce access rights and maintain individual fault-domains for each node. Accordingly, when one of the nodes goes down (e.g., due to a critical error, triggered recovery sequence, or other fault or event), only that node and its transactions involving the shared memory 605 are interrupted (e.g., dumped by the SMC)—transactions of the remaining nodes that involve the shared memory 605 continue on independent of the fault in the other node.

A system can include multiple nodes. Additionally, some example systems can include multiple SMCs. In some cases, a node may be able to access shared memory off a remote SMC to which it is not directly attached to (i.e., the node's local SMC connects to the remote SMC through one or multiple SML Link hops). The remote SMC may be in the same board or could be in a different board. In some cases, some of the nodes may be off-system (e.g., off board or off chip) but nonetheless access shared memory 605. For instance, one or more off-system nodes can connect directly to the SMC using an SML-compliant link, among other examples. Additionally, other systems that include their own SMC and shared memory can also connect with the SMC 610 to extend sharing of memory 605 to nodes included, for instance, on another board that interface with the other SMC connected to the SMC over an SML link. Still further, network connections can be tunneled through to further extend access to other off-board or off-chip nodes. For instance, SML can tunnel over an Ethernet connection (e.g., provided through network controller 620) communicatively coupling the example system of FIG. 6 with another system that can also include one or more other nodes and allow these nodes to also gain access to SMC 615 and thereby shared memory 605, among other examples.

Figure 7:
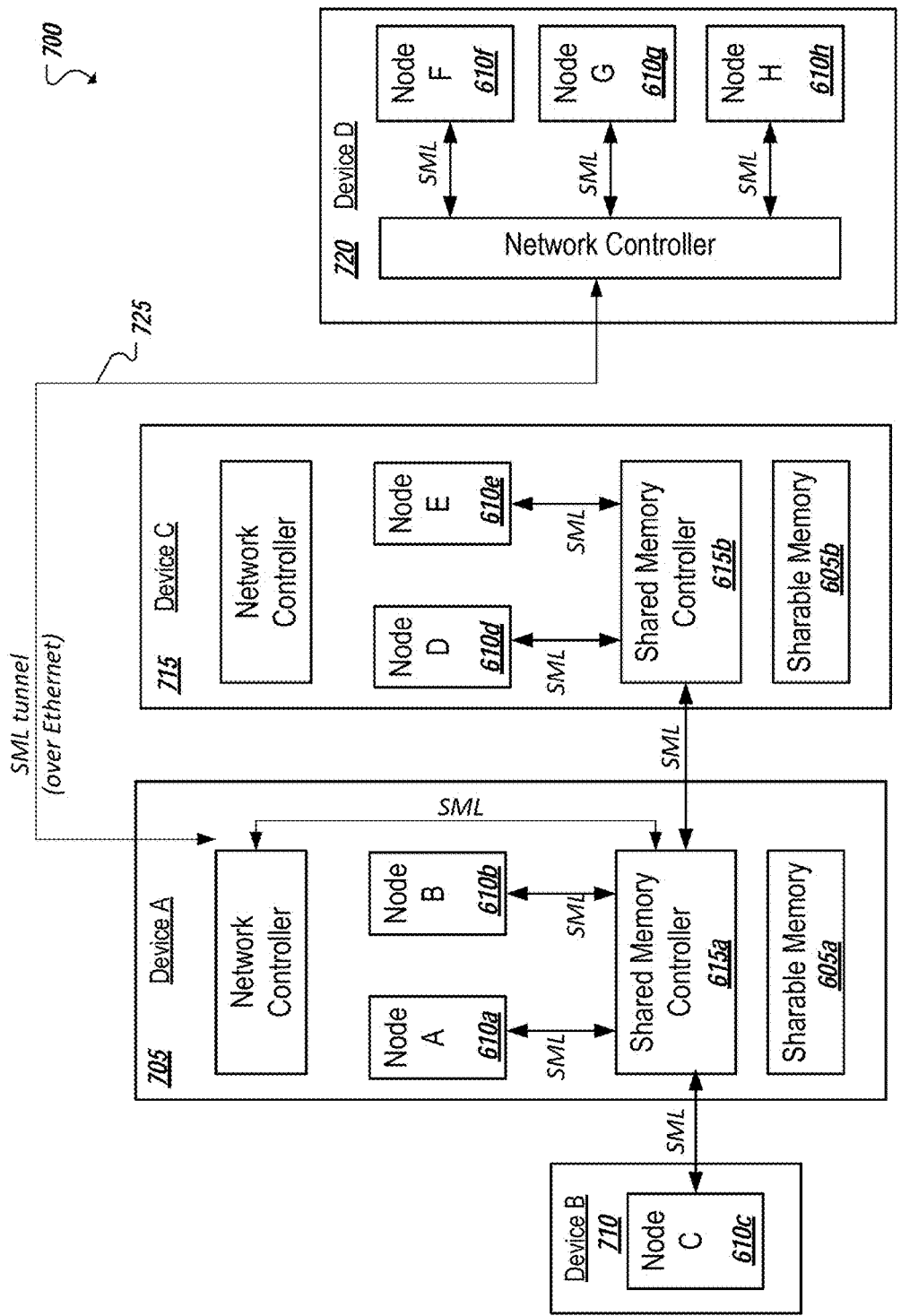
FIG. 7 illustrates a simplified block diagram of an embodiment of an example system including a plurality of nodes.

As another example, as shown in the simplified block diagram 700 of FIG. 7, an improved shared memory architecture permitting shared access by multiple independent nodes according to a LD/ST memory semantic can flexibly allow for the provision of a variety of different multi-node system designs. Various combinations of the multiple nodes can be assigned to share portions of one or more shared memory blocks provided in an example system. For instance, another example system shown in the example of FIG. 7, can include multiple devices 705, 710, 715, 720 implemented, for instance, as separate dies, boards, chips, etc., each device including one or more independent CPU nodes (e.g., 610a-610h). Each node can include its own local memory. One or more of the multiple devices 705, 710, 715, 720 can further include shared memory that can be accessed by two or more of the nodes 610a-610h of the system.

The system illustrated in FIG. 7 is an example provided to illustrate some of the variability that can be realized through an improved shared memory architecture, such as shown and described herein. For instance, each of a Device A 705 and Device C 715 can include a respective shared memory element (e.g., 605a, 605b). Accordingly, in some implementations, each shared memory element on a distinct device may further include a respective shared memory controller (SMC) 615a, 615b. Various combinations of nodes 610a-610h can be communicatively coupled to each SMC (e.g., 615a, 615b) allowing the nodes to access the corresponding shared memory (e.g., 605a, 605b). As an example, SMC 615a of Device A 705 can connect to nodes 610a, 610b on Device A using a direct data link supporting SML. Additionally, another node 610c on another device (e.g., Device C 715) can also have access to the shared memory 605a by virtue of a direct, hardwired connection (supporting SML) from the node 610c (and/or its device 715) to SMC 615a. Indirect, network-based, or other such connections can also be used to allow nodes (e.g., 610f-610h) of a remote or off-board device (e.g., Device D 720) to utilize a conventional protocol stack to interface with SMC 615a to also have access to shared memory 605a. For instance, an SML tunnel 725 can be established over an Ethernet, InfiniBand, or other connection coupling Device A and Device D. While establishing and maintaining the tunnel can introduce some additional overhead and latency, compared to SML running on other less-software-managed physical connections, the SML tunnel 725 when established can operate as other SML channels and allow the nodes 610f-610h to interface with SMC 615a over SML and access shared memory 605a as any other node communicating with SMC over an SML link can. For instance, reliability and ordering of the packets in the SML channels can be enforced either by the networking components in the system or it can be enforced end-to-end between the SMCs.

In still other examples, nodes (e.g., 615d, 615e) on a device different from that hosting a particular portion of shared memory (e.g., 605a) can connect indirectly to the corresponding SMC (e.g., SMC 615a) by connecting directly to another SMC (e.g., 615b) that is itself coupled (e.g., using an SML link) to the corresponding SMC (e.g., 615a). Linking two or more SMCs (e.g., 615a, 615b) can effectively expand the amount of shared memory available to the nodes 610a-610h on the system. For instance, by virtue of a link between SMCs 615a, 615b in the example of FIG. 7, in some implementations, any of the nodes (e.g., 610a-610c, 610f-610h) capable of accessing shared memory 605a through SMC 615a may also potentially access sharable memory 605b by virtue of the connection between SMC 615a and SMC 615b. Likewise, in some implementations, each of the nodes directly accessing SMC 615b can also access sharable memory 605a by virtue of the connection between the SMCs 615a, 615b, among other potential examples.

As noted above, an improved shared memory architecture can include a low-latency link protocol (i.e., SML) based on a memory access protocol, such as SMI3, and provided to facilitate load/store requests involving the shared memory. Whereas traditional SMI3 and other memory access protocols may be configured for use in memory sharing within a single node, SML can extend memory access semantics to multiple nodes to allow memory sharing between the multiple nodes. Further, SML can potentially be utilized on any physical communication link. SML can utilize a memory access protocol supporting LD/ST memory semantics that is overlaid on a physical layer (and corresponding physical layer logic) adapted to interconnect distinct devices (and nodes). Additionally, physical layer logic of SML can provide for no packet dropping and error retry functionality, among other features.

In some implementations, SML can be can be implemented by overlaying SMI3 on a PCIe PHY. An SML link layer can be provided (e.g., in lieu of a traditional PCIe link layer) to forego flow control and other features and facilitate lower latency memory access such as would be characteristic in traditional CPU memory access architectures. In one example, SML link layer logic can multiplex between shared memory transactions and other transactions. For instance, SML link layer logic can multiplex between SMI3 and PCIe transactions. For instance, SMI3 (or another memory protocol) can overlay on top of PCIe (or another interconnect protocol) so that the link can dynamically switch between SMI3 and PCIe transactions. This can allow traditional PCIe traffic to effectively coexist on the same link as SML traffic in some instances.

Figure 8:
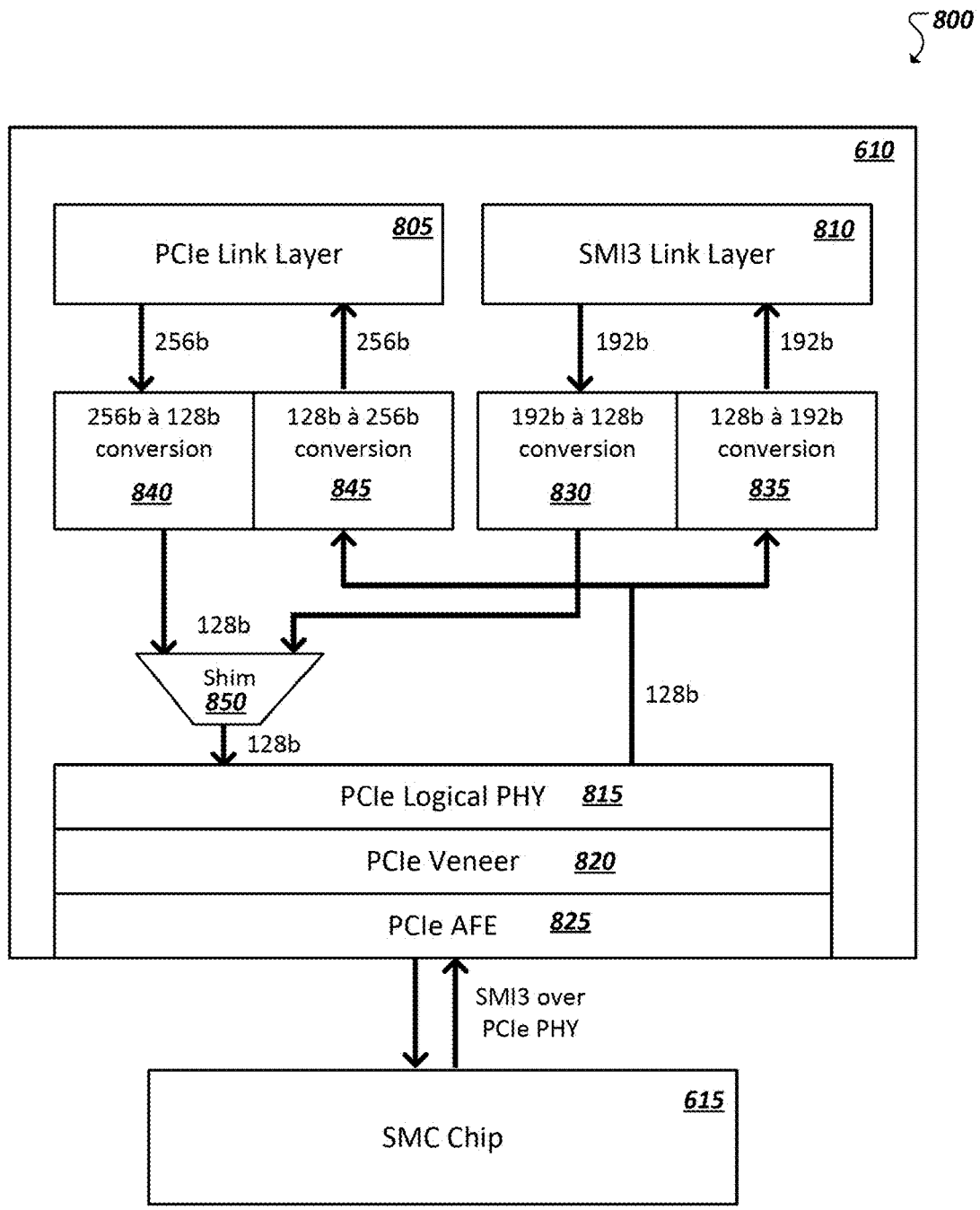
FIG. 8 illustrates example logic of a node including shim logic.

Turning to the simplified block diagram 800 of FIG. 8, features of an example computing node (e.g., 610) are illustrated. The computing node 610 can communicate with a shared memory controller chip 615 using an example SML implemented by overlaying SMI3 (or another memory protocol) over a PCIe (e.g., PCIe 3.0) compliant electrical physical link. The node 610 can include a multi-column layered stack including a column for the memory access protocol (e.g., SMI3) and another column for another interconnect protocol, such as a serial general purpose interconnect protocol, such as PCIe. Each column can have its own link layers (e.g., 805, 810), as well as other layer on top of each respective link layer 805, 810, including transaction, routing, protocol, and/or coherence layers (not shown). In this example, the memory access protocol can use a link layer that utilizes 192-bit flits. Such flits can be sent across on the PHY of another protocol, in this case, a PCIe-compliant PHY that utilizes a native 128-bit encoding scheme (e.g. 128b/130b). Accordingly, PCIe PHY logic of the node 610 can include a PCIe logical PHY 815, PCIe veneer 820 (e.g., an additional layer sitting between the digital and analog domains), and a PCIe analog front end (AFE) 825, among other examples.

Conversion logic 830 can convert the 192-bit flit data sent according to a memory access protocol into 128-bit PCIe payloads for carriage on a PCIe physical link. Likewise, 128-bit payloads can be converted (e.g., using logic 835) back into 192-bit flit data. In this example, the PCIe column can include analogous conversion logic 840, 845 to convert 256b PCIe 3.0 payloads into 128-bit data. Shim circuitry 850 can be provided as an interface between the link layers and the PCIe physical layer. The shim 850 can control which link layer data is sent to the physical layer. In some implementations, the shim 850 can be selectively configured (e.g., by setting fuses in hardware of the node 610) such that it only allows use a single one of the multiple columns (and a single one of link layers 805, 810). For instance, the shim 850 can be set such that the node implements a native PCIe port (i.e., utilizing PCIe link layer 805 only) or an SML port (i.e., a memory access protocol overlaid on the PCIe physical layer and utilizing memory access protocol link layer 810 only). In other instances, the shim 850 can function to dynamically multiplex data from either column, causing the data stream to toggle between a PCIe data mode and SML data mode.

Figure 9:
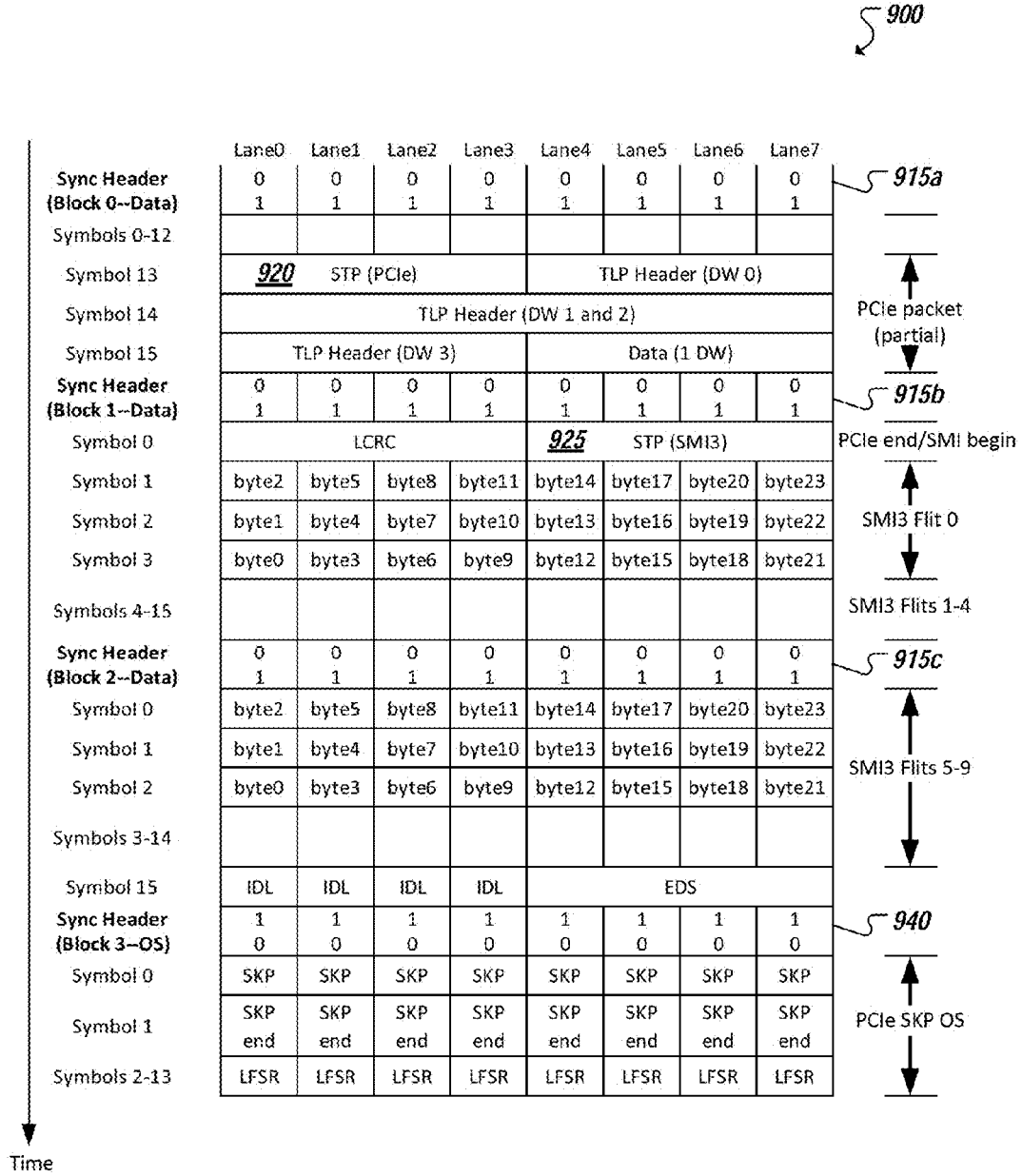
FIG. 9 is a representation of data transmitted according to an example shared memory link.

FIG. 9 illustrates an example of overlaying a memory access protocol on another, different serial interconnection protocol, such as PCIe. In the example of FIG. 9, physical layer framing tokens can be used to signal transitions between memory access and interconnect protocol traffic. A framing token (or "token") can be a physical layer data encapsulation that specifies or implies the number of symbols to be included in a stream of data associated with the token. Consequently, the framing token can identify that a stream is beginning as well as imply where it will end and can therefore be used to also identify the location of the next framing token. A framing token of a data stream can be located in the first symbol (Symbol 0) of the first lane (e.g., Lane 0) of the first data block of the data stream. The framing token can be implemented using an existing symbol as defined in the native protocol of the physical layer used to transport the traffic. For instance, in the example of PCIe, five framing tokens can be defined, including a start of TLP traffic (STP) token, an end of data stream (EDS) token, an end bad (EDB) token, a start of DLLP (SDP) token, and a logical idle (IDL) token.

In the example of FIG. 9, SML can be implemented by overlaying SMI3 or another data access protocol on PCI and the standard PCIe STP token can be re-used and encoded to define a new STP token that identifies that SMI3 (instead of TLP traffic) is to commence on the lanes of the link. In cases where a port is to function statically in SML, the STP token can be encoded to indicate that the traffic is SML. In cases where PCIe and SML traffic can be multiplexed on the link, the STP token can indicate transitions between bursts of PCIe traffic and bursts of SML traffic, among other examples.

In one example, reserve bits of a standard PCIe STP token can be modified to define a start of SML traffic STP token (e.g., an "SML token"). For instance, a set of defined allowed packet or payload lengths may be defined for the host protocol, such as the allowed lengths of PCIe payloads. An STP token may include a length field and the length field may allow for encodings that fall outside the set of the allowed lengths defined for PCIe (or another host protocol of the physical layer). In one implementation, encoding the length field with a disallowed value or another defined value that falls outside the allowed lengths can be used to identify the STP token as an SML token.

Returning to the example of FIG. 9, dynamic SML/PCIe multiplexing is illustrated, with SML utilizing an SMI3 over PCIe PHY protocol. For instance, sync header data can be defined to follow the encoding specified for traditional PCIe 128b/130b encoding. For instance, at 915a-c, sync headers with value 10b are received indicating that data blocks are forthcoming. When a PCIe STP (e.g., 920) is received, a PCIe TLP payload is expected and the data stream is processed accordingly. Consistent with the payload length identified in the PCIe STP 920, the PCIe TLP payload can utilize the full payload length allocated. Another STP token can be received essentially at any time within a data block following the end of the TLP payload. For instance, at 925, an SMI3 STP can be received signaling a transition from PCIe TLP data to SMI3 flit data. The SMI3 STP can then be sent, for instance, as soon as an end of the PCIe packet data is identified.

As with PCIe TLP data, the SMI3 STP 925 can define a length of the SMI3 flit payload that is to follow. For instance, the payload length of the SMI3 data can correspond to the number of SMI3 flits (or number of corresponding DWs) that are to be sent. A window (e.g., ending at Symbol 15 of Lane 3) corresponding to the payload length can thereby be defined on the lanes, in which only SMI3 data is to be sent. When the window concludes, other data can be sent, such as another PCIe STP to recommence sending of TLP data or other data, such as ordered set data. For instance, as shown in the example of FIG. 9, an EDS token is sent following the end of the SMI3 data window defined by SMI3 STP token 925. The EDS token can signal the end of the data stream and imply that an ordered set block is to follow, as is the case in the example of FIG. 9. A sync header 940 is sent that is encoded 01b to indicate that an ordered set block is to be sent. In this case a PCIe SKP ordered set is sent. Such ordered sets can be sent periodically or according to set intervals or windows such that various PHY-level tasks and coordination can be performed, including initializing bit alignment, initializing symbol alignment, exchanging PHY parameters, compensating for different bit rates for two communicating ports, among other examples. In some cases, a mandated ordered set can be sent to interrupt a defined window or data block specified for SMI3 flit data by a corresponding SMI3 STP token.

While not shown explicitly in the example of FIG. 9, an STP token can also be used to transition from SMI3 flit data on the link to PCIe TLP data. For instance, following the end of a defined SMI3 window, a PCIe STP token (e.g., similar to token 920) can be sent to indicate that the next window is for the sending of a specified amount of PCIe TLP data.

Memory access flits (e.g., SMI3 flits) may vary in size in some embodiments, making it difficult to predict, a priori, how much data to reserve in the corresponding STP token (e.g., SMI3 STP token) for the memory access payload. As an example, as shown in FIG. 9, SMI3 STP 925 can have a length field indicating that 244 bytes of SMI3 data is to be expected following the SMI3 STP 925. However, in this example, only ten flits (e.g., SMI3 Flits 0-9) are ready to be sent during the window and these ten SMI3 flits only utilize 240 of the 244 bytes. Accordingly, four (4) bytes of empty bandwidth is left, and these are filled with IDL tokens. This can be particularly suboptimal when PCIe TLP data is queued and waiting for the SMI3 window to close. In other cases, the window provided for the sending of SMI3 flits may be insufficient to send the amount of SMI3 data ready for the lane. Arbitration techniques can be employed to determine how to arbitrate between SMI3 and PCIe TLP data coexisting on the link. Further, in some implementations, the length of the SMI3 windows can be dynamically modified to assist in more efficient use of the link. For instance, arbitration or other logic can monitor how well the defined SMI3 windows are utilized to determine whether the defined window length can be better optimized to the amount of SMI3 (and competing PCIe TLP traffic) expected for the lane. Accordingly, in such implementations, the length field values of SMI3 STP tokens can be dynamically adjusted (e.g., between different values) depending on the amount of link bandwidth that SMI3 flit data should be allocated (e.g., relative to other PCIe data, including TLP, DLLP, and ordered set data), among other examples.

Serial input/output (I/O) operations can consume significant power when operational. Accordingly, it can be desirable to put the link into a low power, or idle, state (e.g., an L1 state) when no traffic is pending in the two directions of the link. This can be true for either or both PCIe or SML mode operation. Further, a memory access protocol used in SML mode may define entry and exit from a low power mode differently from that defined in the host PHY layer protocol (e.g., in PCIe). Further, the state machine utilized by the memory access protocol may be different from than utilized in the other protocol governing the physical layer.

To illustrate, in one implementation of a memory access protocol, the link layer of the memory access protocol can provide opportunities for the physical layer to perform control tasks, and these control tasks can include the transition from a transmitting link state (TLS) to a low power, or L1, state. For instance, when used outside of an SML context that involves using a PHY of a foreign protocol, the memory access protocol can provide control state (L0c), or blocking link state, windows in which physical layer requests and responses can be sent. As an example, a control state L0c can be provided to facilitate messaging related to such control tasks. The L0c state can be provided as a periodic window within the TLS to allow Physical layer control messages to be sent between streams of flits sent using the Link layer. For instance, as represented in the example illustrated in FIG. 10, an L0 state can be subdivided into L0c intervals. Each L0c interval can begin with a L0c state or window (e.g., 1005) in which Physical layer control codes and other data can be sent. The remainder (e.g., 1010) of the L0c interval can be dedicated to the sending of flits. The length of the L0c interval and L0c state in each interval can be programmatically defined, for instance by BIOS of one or more devices or another software-based controller, among other examples. The L0c state can be exponentially shorter than the remainder of an L0c interval. For instance, in one example, the L0c can be 8 UI while the remainder of the L0c interval is on the order of 4 KUI, among other examples. This can allow windows in which relatively short, predefined messages can be sent without substantially disrupting or wasting link data bandwidth.

An L0c state message can communicate a variety of conditions at the Physical layer level. In one example, one device can initiate a reset of the link or a lane, for instance, based on bit errors or other errors in excess of a particular threshold amount. Such errors can also be communicated in L0c windows (such as preceding L0c windows). The L0c state can also be leveraged to realize other in-band signaling, such as signaling for use in aiding or triggering transitions between other link states. In one example, L0c messages can be utilized to transition a link from an active L0 state to a standby or low power state, such as an L1 state. As shown in the simplified flow diagram 1100a of FIG. 11A, a particular L0c state can be used to communicate a L1 entry request (e.g., 1110). Further flits (e.g., 1120, 1130) can be sent while the device (or agent on the device) waits for an acknowledgement of the request 1110. The other device on the link can send the acknowledgement (e.g., 1140). In some examples, the acknowledgement can also be sent in an L0c window. In some instances, the acknowledgement can be sent in the next L0c window following receipt/sending of the L1 request 1110. Timers can be employed to synchronize the L0c intervals at each device and the requesting device can identify the acknowledgement 1140 as an acknowledgement of the request 1110 (e.g., rather than an independent L1 entry request) based on an identification that the acknowledgement 1140 was sent at the next L0c window, among other examples. In some instances, an acknowledgement can be communicated through an L0c code distinct from that used in the L1 entry request 1110. In other instances, the acknowledgement 1140 can include the echoing of the L1 entry request code used in request 1110, among other examples. Further, in alternative examples, such as illustrated in FIG. 11B, a non-acknowledge signal or NAK 1145 can be communicated in the L0c window, causing the link to remain in a link transmitting state despite the L1 entry request 1110.

The examples of FIGS. 10, 11A, and 11B are but one example of a low power transition handshake according to a memory access or other protocol used by an implementation of SML. Other mechanisms can be employed in other embodiments to realize a transition from an active state to a low power, or idle state. However, such mechanisms may not be supported in instances where the memory access protocol is overlaid on the physical layer of another protocol, such as in implementations of SML where a memory access protocol (e.g., SMI3) is overlaid on another serial interconnect protocol, such as PCIe. Indeed, the host protocol utilized by the PHY may implement transitions from an active state to a low power state differently, complicating the memory access protocol's ability to initiate a transition to a low power state. This can be especially troublesome in implementations where SML is implemented statically (i.e., is the only traffic on the physical layer of the other protocol).

Figure 12:
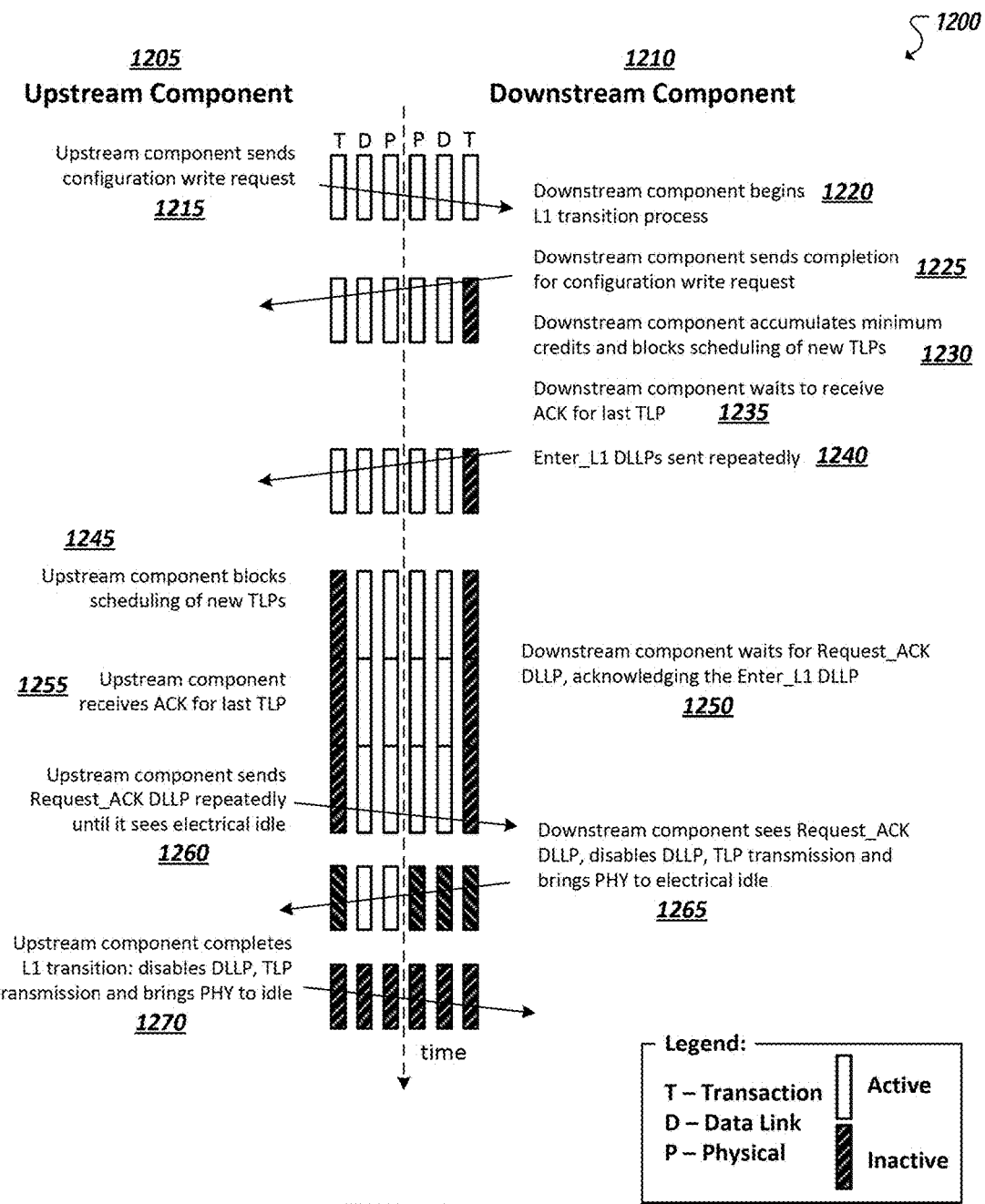
FIG. 12 is a representation of another example handshake.

To illustrate such potential differences, compare the mechanism for entry into a low power state illustrated in FIGS. 10, 11A, and 11B with the representation (in FIG. 12) of an entry into a low power L1 state in PCIe. For instance, a first (upstream) component 1205 can send a configuration write request 1215 to a downstream component 1210. The downstream component 1210 can begin the process of transitioning (e.g., at 1220) from a transmitting link state to a low power state (L1) based on the receipt of the configuration write request 1215. The downstream component 1210 can send a completion 1225 for the configuration write request and accumulate minimum credits and blocks scheduling of new transaction layer packets (TLPs) (at 1230). The downstream component 1210 can wait (at 1235) to receive an acknowledgment (ACK) for the last TLP. Once all of the downstream components' TLPs have been acknowledged, the downstream component can start to transmit 1240 Enter_L1 data link layer packets (DLLPs) (to indicate the entry into the L1 state) until it receives a response from the upstream component 1205.

Upon receiving the Enter_L1 DLLPs, the upstream component 1205 can block (at 1245) the scheduling of new TLP transmissions. The upstream component 1205 can then wait until it receives a link layer acknowledgement for the last TLP it had previously sent. The downstream component 1210 can wait (at 1250) for acknowledgement DLLPs (e.g., Request_ACK) to the transmitted Enter_L1 DLLPs. When the upstream component 1205 receives the ACK (at 1255) for its last TLP the upstream component 1205 can send Request_ACK DLLPs 1260 repeatedly in response to the received Enter_L1 DLLPs. Once the downstream component 1210 has captured the Request_Ack DLLP on its receive lanes (signaling that the upstream component 1205 has acknowledged the transition to L1 request), it then disables (at 1265) DLLP transmission and brings the upstream directed physical link into the electrical idle state. Further, as the receive lanes on the upstream component 1205 enter the electrical idle state, the upstream component 1205 stops sending Request_Ack DLLPs, disables (at 1270) DLLP transmission, and brings its transmit lanes to electrical idle to thereby complete the transition of the link to L1. L1 can be exited, in some instances, by the component on either end of a link.

As noted, it can be desirable to provide for either a host protocol or SML protocol to be used to initiate a transition into a low power link state. However, in some implementations, a memory access protocol used by SML may not be able to delegate the negotiation of entry into a low power state to the PHY layer, such as is shown and described in the examples of FIGS. 10, 11A, and 11B. Accordingly, in some implementations of an SML, an L1 entry scheme can be provided that allows the native encodings of the memory access protocol used to enter a low power state to be tunneled in tokens used to facilitate SML. For instance, in one example, the memory access protocol used by SML can send link state transition requests (and acknowledgements) within blocking link state, or control windows. These same encodings can be included in reserved or unused fields of the token, such that they are communicated to a downstream component without affecting the host (e.g., PCIe) protocol or layered stack. In one implementation, a field of the STP token (e.g., SML token) can be encoded with data values that indicate a request (or ACK/NAK) to enter a low power state.

Figure 13:
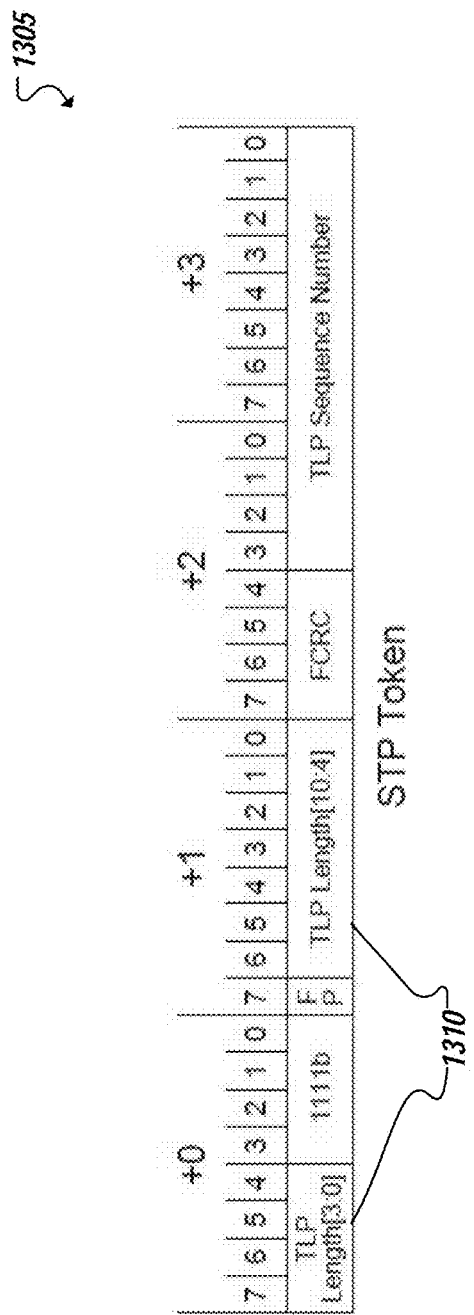
FIG. 13 is a representation of an example start of data framing token.

Turning to FIG. 13, a representation of a STP token 1305 is shown. The STP token 1305 can include several fields, including a TLP sequence number field 1310, and a length field 1315 field that identifies the length of the memory access protocol (e.g., SMI3) payload (in terms of the number of flits) that is to follow the STP. As noted above, the length field can be used, in some implementations, to indicate whether the following data is according to the host interconnect protocol (e.g., PCIe) or according to the memory access protocol (e.g., SMI3). For instance, one or more standard payload lengths can be defined for TLP data. SMI3 data can, in some implementations, be defined to include a fixed number of flits, or in other cases, may have variable numbers of flits in which case the length field for the number of SMI3 flits becomes a field that can be disregarded. Further, the length field for an SMI3 STP can be defined as a length other than one of the defined TLP payload lengths. Accordingly, an SMI3 STP can be identified based on a non-TLP length value being present in the STP length field, as one example.

Continuing with the example of FIG. 13, the TLP sequence number field 1310 can be reserved (or unused) when the STP is a SML STP token. The TLP sequence number field 1310 can be encoded to indicate a request to transition to L1, to indicate an ACK or NAK to a request to enter La, or to indicate that no operation is included in the SML STP token, among other possible encodings. For instance, in one example implementations, a set of values can be defined for use in control windows in a native version of a memory access protocol and these same values can be encoded in a reserved field of a SML STP token. For instance, in an implementation utilizing SMI3 as a memory access protocol:

TABLE 1

| Encoding | Meaning |
| --- | --- |
| x333 | SMI3 QNOP: No operation |
| x999 | SMI3 QL1: Request to enter a low power L1 state |
| X666 | SMI3 QL1n: A non-acknowledgment (NAK) to a request to enter L1 |
| Others | Reserved |

Continuing with the example of Table 1, a handshake can be defined such that a request to enter L1, encoded in an SML STP token can be answered with either an SML STP token encoded to echo, and acknowledge, the request to enter L1 (e.g., QL1) or, alternatively, with a non-acknowledgement message (e.g., QL1n). In the latter case, the process can be repeated periodically until an acknowledgement handshake is achieved. Designated fields of an SML STP token that are not encoded to indicate a request (or response) to enter L1 or a response, can be encoded with an alternative encoding or a no operation encoding, among other examples.

Figure 14:
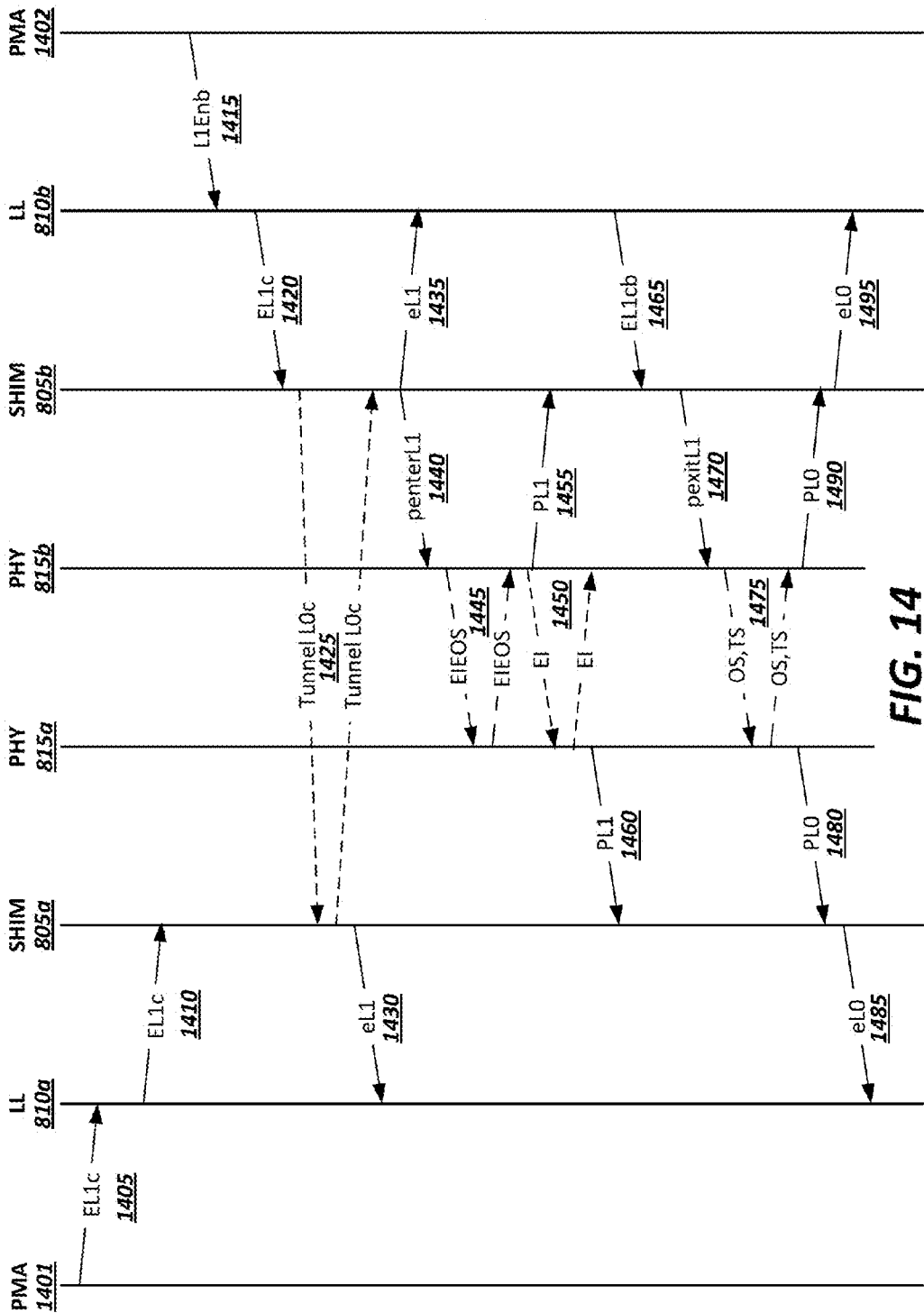
FIG. 14 is a flowchart illustrating example techniques for entering a low power link state.

FIG. 14 is a flowchart illustrating an example of a handshake to enter L1, in accordance with at least one example. In this example, a shim 850 can be used to facilitate tunneling of a low power state entry request of a memory access protocol over PCIe. For instance, power management agents (PMA) 1401, 1402 can asynchronously enable (e.g., at 1405, 1415) respective link layers to go to low power. The respective link layers (LL) 810a, 810b can then communicate with shims (805a, 805b respectively) to initiate entry into the low power state (e.g., L1) (at 1410, 1420). For instance, the shims 805a, 805b can receive the L1 entry signals 1410, 1420 according to the memory access protocol. The shims 805a, 805b can include logic for identifying that the EL1c data is a request, according to the memory access protocol, to enter a low power state L1. The shim 805b can encode a field of a PCIe token, such as a TLP sequence number field of a PCIe-based STP token, with a low power entry request encoding defined in the memory access protocol. For instance, the memory access protocol can use a blocking link state (L0c) to send such codes, and the shims 805a,b can be used to tunnel a L0c low power entry handshake utilizing the PCIe-based token field (at 1425). Accordingly, when shim 805a receives the encoded token, it can signal the link layer 810a (at 1430) to enter L1. The shim 805a can also send an acknowledgement of the L1 entry request (at 1425) and shim 805b, upon receiving the ACK, can signal (at 1435) its link layer 810b to enter L1. Further, upon receiving the acknowledgement, the shim 805b can further signal (at 1440) the physical layer 815b to initiate the PCIe physical layer L1 entry handshake. Accordingly, one or more electrical idle ordered sets (EIEOS) can be sent by PHY 815b and echoed by PHY 815a to cause the PCIe physical layer to enter electrical idle 1450. The same can be confirmed through signals 1455, 1460 to the respective shims 805a, 805b.

Continuing with the example of FIG. 14, at some instance following the link's entry into L1, a link layer 810b (as prompted by software) can initiate an exit from the low power L1 state to re-enter a transmitting link state (e.g., L0 or L0p). For instance, an L1 exit signal 1465 can be sent to and decoded by the shim 805b and the shim 805b can signal PHY 815b (at 1470) to exit the low power state and begin configuring the link for a transmitting link state. For instance, to debounce, synchronize, and configure the link, ordered sets (OS) and training sequences (TS) may be exchanged (at 1475). Upon conclusion of link training (e.g., through 1475) the shims 805a, 805b can identify that the physical layer is in a transmitting state L0. The shims 805a, 805b can then inform the link layers 810a, 810b that L0 has been entered. In cases, where the shims 805a, 805b provide dynamic multiplexing of memory access protocol data and PCIe data over the PCIe physical layer, an entry into L0 (or L1) can be communicated by the shims 805a, 805b to both the memory access protocol and PCIe link layers, among other examples.

In implementations supporting dynamic toggling between a general purpose I/O (GPIO) protocol (e.g., PCIe) and a memory access protocol (e.g., SMI3) over a physical layer of the GPIO protocol, a shim may determine that both protocol stacks are ready to enter a low power link state (e.g., L1) before signaling the common physical layer to enter electrical idle. For instance, either the GPIO protocol link layer (during its portion of the bandwidth) or the memory access protocol, may independently request (according to its respective protocol) to enter a low power link state. However, when one column attempts to enter a low power state, the other column may have data waiting to be sent on the active link. Dynamic shims may have the ability to arbitrate bandwidth demands between the stacks in some implementations. Accordingly, in some implementations, the shim, when multiplexing data from the two different protocol stacks, can monitor both columns to ensure that no data is to be sent by one of the columns in an upcoming division of the bandwidth (e.g., following an STP token), before granting the other column's request to enter a low power state. In some implementations, the shim may synthesize a confirmation that a PHY has entered L1 to a column requesting the entry into L1, while withholding the request to the PHY that would trigger actual entry into L1 until the shim determines that doing so would not affect data waiting to be sent from the other column. For instance, a first column may be permitted to utilize the physical link after the other second column has requested entry into L1 and believes the link to actually be in L1. In such instances, as soon as the first column is done sending data, the shim may signal the physical layer to cause the link to enter idle. In other instances, the link layer of the second column may re-awaken while the link remains active and attempt to re-activate an already active link (i.e., that is being used to send data of the other column). In such instances, the shim may receive data from the link layer of the second column to initiate activation of the link. In such instances, the shim can synthesize, to the link layer second column, confirmation of the re-awakening of the link. In practice, as the link is already trained and operational, no action is to be taken as it relates to the physical layer and the shim may simply send a confirmation signal to the second column that the link is active in response to a signal from the link layer of the second column to cause the link to "exit" the low power state. In such instances, not only can the bandwidth of a signal physical link be shared between the data of two distinct protocols, but the low power state entry paradigms of the different protocols may also be supported.

It should be noted that while much of the above principles and examples are sometimes described within the context of certain protocols, such as PCIe and SMI3. However, it should be appreciated that these protocols are named only as examples and that any serial GPIO protocol and memory access protocol can be utilized in an implementations of SML. Indeed, the principles, solutions, and features described herein can be equally applicable to other protocols and systems. Moreover, combinations of the above solutions can be applied within systems, including combinations of logical and physical enhancements to a link and its corresponding logic as described herein, among other examples.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 15:
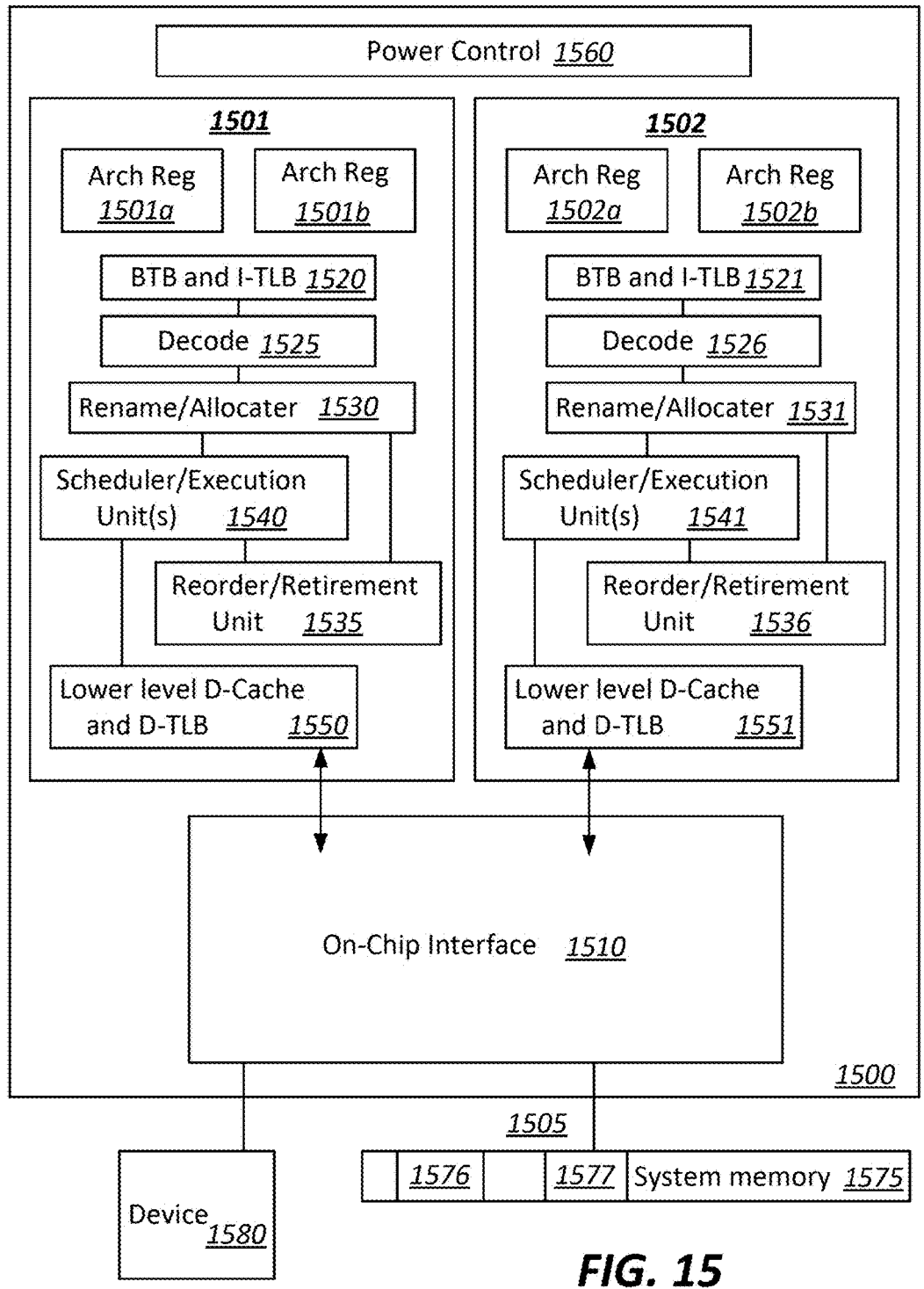
FIG. 15 illustrates an embodiment of a block diagram for a computing system including a multicore processor.

Referring to FIG. 15, an embodiment of a block diagram for a computing system including a multicore processor is depicted. Processor 1500 includes any processor or processing device, such as a microprocessor, an embedded processor, a digital signal processor (DSP), a network processor, a handheld processor, an application processor, a co-processor, a system on a chip (SOC), or other device to execute code. Processor 1500, in one embodiment, includes at least two cores—core 1501 and 1502, which may include asymmetric cores or symmetric cores (the illustrated embodiment). However, processor 1500 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1500, as illustrated in FIG. 15, includes two cores—core 1501 and 1502. Here, core 1501 and 1502 are considered symmetric cores, i.e. cores with the same configurations, functional units, and/or logic. In another embodiment, core 1501 includes an out-of-order processor core, while core 1502 includes an in-order processor core. However, cores 1501 and 1502 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1501 are described in further detail below, as the units in core 1502 operate in a similar manner in the depicted embodiment.

As depicted, core 1501 includes two hardware threads 1501a and 1501b, which may also be referred to as hardware thread slots 1501a and 1501b. Therefore, software entities, such as an operating system, in one embodiment potentially view processor 1500 as four separate processors, i.e., four logical processors or processing elements capable of executing four software threads concurrently. As alluded to above, a first thread is associated with architecture state registers 1501a, a second thread is associated with architecture state registers 1501b, a third thread may be associated with architecture state registers 1502a, and a fourth thread may be associated with architecture state registers 1502b. Here, each of the architecture state registers (1501a, 1501b, 1502a, and 1502b) may be referred to as processing elements, thread slots, or thread units, as described above. As illustrated, architecture state registers 1501a are replicated in architecture state registers 1501b, so individual architecture states/contexts are capable of being stored for logical processor 1501a and logical processor 1501b. In core 1501, other smaller resources, such as instruction pointers and renaming logic in allocator and renamer block 1530 may also be replicated for threads 1501a and 1501b. Some resources, such as re-order buffers in reorder/retirement unit 1535, ILTB 1520, load/store buffers, and queues may be shared through partitioning. Other resources, such as general purpose internal registers, page-table base register(s), low-level data-cache and data-TLB 1515, execution unit(s) 1540, and portions of out-of-order unit 1535 are potentially fully shared.

Processor 1500 often includes other resources, which may be fully shared, shared through partitioning, or dedicated by/to processing elements. In FIG. 15, an embodiment of a purely exemplary processor with illustrative logical units/ resources of a processor is illustrated. Note that a processor may include, or omit, any of these functional units, as well as include any other known functional units, logic, or firmware not depicted. As illustrated, core 1501 includes a simplified, representative out-of-order (OOO) processor core. But an in-order processor may be utilized in different embodiments. The OOO core includes a branch target buffer 1520 to predict branches to be executed/taken and an instruction-translation buffer (I-TLB) 1520 to store address translation entries for instructions.

Core 1501 further includes decode module 1525 coupled to fetch unit 1520 to decode fetched elements. Fetch logic, in one embodiment, includes individual sequencers associated with thread slots 1501a, 1501b, respectively. Usually core 1501 is associated with a first ISA, which defines/ specifies instructions executable on processor 1500. Often machine code instructions that are part of the first ISA include a portion of the instruction (referred to as an opcode), which references/specifies an instruction or operation to be performed. Decode logic 1525 includes circuitry that recognizes these instructions from their opcodes and passes the decoded instructions on in the pipeline for processing as defined by the first ISA. For example, as discussed in more detail below decoders 1525, in one embodiment, include logic designed or adapted to recognize specific instructions, such as transactional instruction. As a result of the recognition by decoders 1525, the architecture or core 1501 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1526, in one embodiment, recognize the same ISA (or a subset thereof). Alternatively, in a heterogeneous core environment, decoders 1526 recognize a second ISA (either a subset of the first ISA or a distinct ISA).

In one example, allocator and renamer block 1530 includes an allocator to reserve resources, such as register files to store instruction processing results. However, threads 1501a and 1501b are potentially capable of out-of-order execution, where allocator and renamer block 1530 also reserves other resources, such as reorder buffers to track instruction results. Unit 1530 may also include a register renamer to rename program/instruction reference registers to other registers internal to processor 1500. Reorder/retirement unit 1535 includes components, such as the reorder buffers mentioned above, load buffers, and store buffers, to support out-of-order execution and later in-order retirement of instructions executed out-of-order.

Scheduler and execution unit(s) block 1540, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1550 are coupled to execution unit(s) 1540. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1501 and 1502 share access to higher-level or further-out cache, such as a second level cache associated with on-chip interface 1510. Note that higher-level or further-out refers to cache levels increasing or getting further way from the execution unit(s). In one embodiment, higher-level cache is a last-level data cache—last cache in the memory hierarchy on processor 1500—such as a second or third level data cache. However, higher level cache is not so limited, as it may be associated with or include an instruction cache. A trace cache—a type of instruction cache— instead may be coupled after decoder 1525 to store recently decoded traces. Here, an instruction potentially refers to a macro-instruction (i.e. a general instruction recognized by the decoders), which may decode into a number of micro-instructions (micro-operations).

In the depicted configuration, processor 1500 also includes on-chip interface module 1510. Historically, a memory controller, which is described in more detail below, has been included in a computing system external to processor 1500. In this scenario, on-chip interface 1510 is to communicate with devices external to processor 1500, such as system memory 1575, a chipset (often including a memory controller hub to connect to memory 1575 and an I/O controller hub to connect peripheral devices), a memory controller hub, a northbridge, or other integrated circuit. And in this scenario, bus 1505 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1575 may be dedicated to processor 1500 or shared with other devices in a system. Common examples of types of memory 1575 include DRAM, SRAM, non-volatile memory (NV memory), and other known storage devices. Note that device 1580 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1500. For example in one embodiment, a memory controller hub is on the same package and/or die with processor 1500. Here, a portion of the core (an on-core portion) 1510 includes one or more controller(s) for interfacing with other devices such as memory 1575 or a graphics device 1580. The configuration including an interconnect and controllers for interfacing with such devices is often referred to as an on-core (or un-core configuration). As an example, on-chip interface 1510 includes a ring interconnect for on-chip communication and a high-speed serial point-to-point link 1505 for off-chip communication. Yet, in the SOC environment, even more devices, such as the network interface, co-processors, memory 1575, graphics processor 1580, and any other known computer devices/interface may be integrated on a single die or integrated circuit to provide small form factor with high functionality and low power consumption.

In one embodiment, processor 1500 is capable of executing a compiler, optimization, and/or translator code 1577 to compile, translate, and/or optimize application code 1576 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 16:
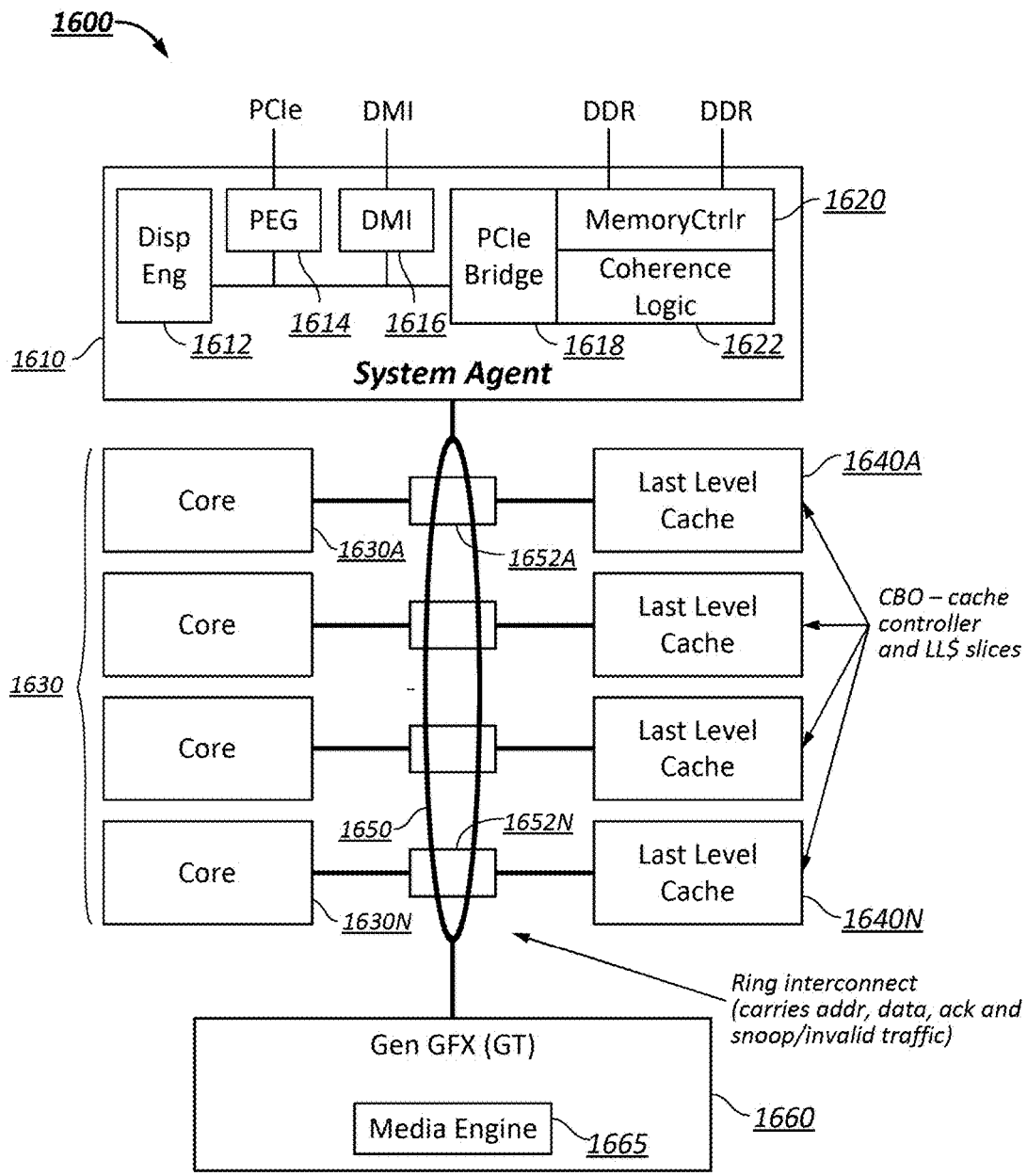
FIG. 16 illustrates another embodiment of a block diagram for a computing system including a multicore processor.

Referring now to FIG. 16, shown is a block diagram of an embodiment of a multicore processor. As shown in the embodiment of FIG. 16, processor 1600 includes multiple domains. Specifically, a core domain 1630 includes a plurality of cores 1630A-1630N, a graphics domain 1660 includes one or more graphics engines having a media engine 1665, and a system agent domain 1610.

In various embodiments, system agent domain 1610 handles power control events and power management, such that individual units of domains 1630 and 1660 (e.g. cores and/or graphics engines) are independently controllable to dynamically operate at an appropriate power mode/level (e.g. active, turbo, sleep, hibernate, deep sleep, or other Advanced Configuration Power Interface like state) in light of the activity (or inactivity) occurring in the given unit.

Each of domains 1630 and 1660 may operate at different voltage and/or power, and furthermore the individual units within the domains each potentially operate at an independent frequency and voltage. Note that while only shown with three domains, understand the scope of the present invention is not limited in this regard and additional domains may be present in other embodiments.

As shown, each core 1630 further includes low level caches in addition to various execution units and additional processing elements. Here, the various cores are coupled to each other and to a shared cache memory that is formed of a plurality of units or slices of a last level cache (LLC) 1640A-1640N; these LLCs often include storage and cache controller functionality and are shared amongst the cores, as well as potentially among the graphics engine too.

As seen, a ring interconnect 1650 couples the cores together, and provides interconnection between the core domain 1630, graphics domain 1660 and system agent circuitry 1610, via a plurality of ring stops 1652A-1652N, each at a coupling between a core and LLC slice. As seen in FIG. 16, interconnect 1650 is used to carry various information, including address information, data information, acknowledgement information, and snoop/invalid information. Although a ring interconnect is illustrated, any known on-die interconnect or fabric may be utilized. As an illustrative example, some of the fabrics discussed above (e.g. another on-die interconnect, On-chip System Fabric (OSF), an Advanced Microcontroller Bus Architecture (AMBA) interconnect, a multi-dimensional mesh fabric, or other known interconnect architecture) may be utilized in a similar fashion.

As further depicted, system agent domain 1610 includes display engine 1612 which is to provide control of and an interface to an associated display. System agent domain 1610 may include other units, such as: an integrated memory controller 1620 that provides for an interface to a system memory (e.g., a DRAM implemented with multiple DIMMs; coherence logic 1622 to perform memory coherence operations. Multiple interfaces may be present to enable interconnection between the processor and other circuitry. For example, in one embodiment at least one direct media interface (DMI) 1616 interface is provided as well as one or more PCIe™ interfaces 1614. The display engine and these interfaces typically couple to memory via a PCIe™ bridge 1618. Still further, to provide for communications between other agents, such as additional processors or other circuitry, one or more other interfaces may be provided.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide an apparatus, a system, a machine readable storage, a machine readable medium, hardware- and/or software-based logic, and method to send data to correspond to a load/store-type operation associated with shared memory over a link according to a memory access link protocol and the memory access link protocol is to be overlaid on another, different link protocol, and send a request to enter a low power state, where the request is to include a data value encoded in a field of a token, the token is to indicate a start of packet data and is to further indicate whether subsequent data to be sent after the token is to include data according to one of the other link protocol and the memory access link protocol.

In at least one example, the other link protocol includes a general purpose input/output (I/O) interconnect protocol.

In at least one example, the token is defined according to the general purpose I/O interconnect protocol.

In at least one example, a first field of the token indicates whether the subsequent data includes memory access link protocol data or general purpose I/O interconnect protocol data.

In at least one example, the data value is to be encoded in a second field of the token when the first field indicates that the subsequent data is to include memory access link protocol data.

In at least one example, the data value includes an encoding defined under the memory access link protocol and the second field is used to tunnel the encoding over the physical layer of the general purpose I/O interconnect protocol.

In at least one example, data sent on the link is to toggle between memory access link protocol data and general purpose I/O interconnect protocol data based on instances of the token.

In at least one example, power management logic is to check whether data of the general purpose I/O interconnect protocol is waiting to be sent prior to sending the request to enter the low power state.

In at least one example, power management logic is to wait to send the request to enter the low power state until the general purpose I/O interconnect protocol data is sent.

In at least one example, a link layer of either the memory access link protocol or general purpose I/O interconnect protocol can trigger entry of a physical layer into a low power state.

In at least one example, a signal used to enter a low power state in the general purpose I/O interconnect protocol is different from a signal used to enter a low power state in the memory access link protocol.

In at least one example, the memory access link protocol defines periodic control windows in which to send the signal to enter the low power state in the memory access link protocol.

One or more embodiments may provide an apparatus, a system, a machine readable storage, a machine readable medium, hardware- and/or software-based logic, and method to receive a data stream over a link. The data stream can include a token, which includes a first field to indicate that data subsequent to the token includes data according to one of at least two alternate protocols. The at least two alternate protocols can include a memory access protocol and a general purpose I/O protocol. All data sent over the link is to be sent over a physical layer of the general purpose I/O protocol, and a second field of the token is to be encoded to indicate a request by a link layer of the memory access protocol to enter a low power link state. Entry into the low power link state can be initiated based on the request.

In at least one example, a response is sent to the request that includes one of an acknowledgement and a negative acknowledgement, and the response is to be sent in another instance of the token.

In at least one example, the response is to be sent an instance of the second field in the other instance of the token.

One or more embodiments may provide an apparatus, a system, a machine readable storage, a machine readable medium, hardware- and/or software-based logic, that provide a link layer of a first protocol, a link layer of a different second protocol, a physical layer of the first protocol for sending data of at least the second protocol, and a shim. The shim can receive a data stream that includes a token that includes a first field to indicate that data subsequent to the token includes one of first protocol data or second protocol data, and a second field of the token is to be encoded to indicate a request by a the link layer of the second protocol to enter a low power link state. The shim can further send data to the physical layer to cause the physical layer to enter the low power state.

In at least one example, the first protocol is to include a general purpose I/O interconnect protocol and the second protocol is to include a memory access protocol.

In at least one example, one or more layers of the first protocol and one or more layers of the second protocol are also included.

In at least one example, the link layer of the first protocol is disabled.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
a transmitter to send data to correspond to a load/store-type operation associated with shared memory, wherein the data is to be sent over a link according to a memory access interconnect protocol, the memory access interconnect protocol comprises a layered protocol comprising a first link layer, the memory access interconnect protocol utilizes a physical layer of another interconnect protocol, and the other interconnect protocol comprises a layered protocol comprising the physical layer and a different, second link layer;
power management logic to send a request to enter a low power state, wherein the request is to comprise a data value encoded in a first field of a physical layer token, the physical layer token is to indicate a start of packet data and is to further include a second field to be encoded to indicate whether subsequent data to be sent after the physical layer token is to comprise data according to one of the other interconnect protocol and the memory access interconnect protocol, wherein the physical layer token is defined according to the other interconnect protocol,
wherein the data value comprises an encoding defined under the memory access interconnect protocol and the first field is used to tunnel the encoding over the physical layer of the other interconnect protocol.

2. The apparatus of claim 1, wherein the other interconnect protocol comprises a general purpose input/output (I/O) interconnect protocol.

3. The apparatus of claim 1, wherein the first field comprises a sequence number field and the second field comprises a length field used in the other interconnect protocol to identify a length of a payload.

4. The apparatus of claim 3, wherein the other interconnect protocol comprises a Peripheral Component Interconnect Express (PCIe)-based protocol.

5. The apparatus of claim 1, wherein the data value is to be encoded in the first field of the physical layer token when the second field indicates that the subsequent data is to comprise memory access interconnect protocol data.

6. The apparatus of claim 2, wherein data sent on the link is to toggle between memory access interconnect protocol data and general purpose I/O interconnect protocol data based on instances of the physical layer token.

7. The apparatus of claim 6, wherein the power management logic is to check whether data of the general purpose I/O interconnect protocol is waiting to be sent prior to sending the request to enter the low power state.

8. The apparatus of claim 7, wherein the power management logic is to wait to send the request to enter the low power state until the general purpose I/O interconnect protocol data is sent.

9. The apparatus of claim 6, wherein a link layer of either the memory access interconnect protocol or general purpose I/O interconnect protocol can trigger entry of a physical layer into a low power state.

10. The apparatus of claim 9, wherein a signal used to enter a low power state in the general purpose I/O interconnect protocol is different from a signal used to enter a low power state in the memory access interconnect protocol.

11. The apparatus of claim 10, wherein the memory access link protocol defines periodic control windows in which to send the signal to enter the low power state in the memory access interconnect protocol.

12. An apparatus comprising:
a receiver to receive a data stream over a link, wherein the data stream is to comprise a physical layer token, the physical layer token is to comprise a first field to indicate that data subsequent to the physical layer token is to comprise data according to one of at least two alternate protocols, the at least two alternate protocols are to comprise a memory access protocol and a general purpose I/O protocol, the physical layer token comprises a particular value comprising an encoding defined under the memory access interconnect protocol, all data sent over the link is to be sent over a physical layer of the general purpose I/O protocol, the first field is used to tunnel the encoding over the physical layer of the general purpose I/O protocol, and a second field of the physical layer token is to be encoded to indicate a request by a link layer of the memory access protocol to enter a low power link state, wherein the memory access protocol comprises a layered protocol comprising a first link layer, and the general purpose I/O protocol comprises a layered protocol comprising the physical layer and a different, second link layer; and
protocol logic to initiate entry into the low power link state based on the request.

13. The apparatus of claim 12, further comprising:
a transmitter to send a response to the request, wherein the response is to comprise one of an acknowledgement and a negative acknowledgement, and the response is to be sent in another instance of the physical layer token.

14. The apparatus of claim 13, wherein the response is to be sent an instance of the second field in the other instance of the physical layer token.

15. A method comprising:
receiving a data stream over a link, wherein the data stream comprises a first instance of a physical layer token, instances of the physical layer token are to comprise a first field to indicate that data subsequent to the physical layer token is to comprise data according to one of at least two alternate protocols, the at least two alternate protocols are to comprise a memory access protocol and a general purpose I/O protocol, the physical layer token comprises an encoding defined under the memory access interconnect protocol, all data sent over the link is to be sent over a physical layer of the general purpose I/O protocol, the first field is used to tunnel the encoding over the physical layer of the general purpose I/O protocol, and a second field of the first instance of the physical layer token is to be encoded to indicate a request by a link layer of the memory access protocol to enter a low power link state, wherein the memory access protocol comprises a layered protocol comprising a first link layer, and the general purpose I/O protocol comprises a layered protocol comprising the physical layer and a different, second link layer;
sending a response to the request, wherein the response is to comprise one of an acknowledgement and a negative acknowledgement, and the response is to be sent in another instance of the physical layer token; and initiating entry into the low power link state based on the request.

16. An apparatus comprising:
a link layer of a particular interconnect protocol;
a link layer of a memory access protocol different from the particular interconnect protocol;
a physical layer of the particular interconnect protocol, wherein data of the memory access protocol is to be sent over the physical layer of the particular interconnect protocol;
a shim to:
  receive a data stream, wherein the data stream is to comprise a physical layer token implemented using one or more symbols of the physical layer of the first protocol, the physical layer token is to comprise a first field to indicate that data subsequent to the physical layer token is to comprise one of data according to the particular interconnect protocol or data according to the memory access protocol, a second field of the physical layer token is to be encoded to indicate a request by the link layer of the memory access protocol to enter a low power link state, and the first field is used to tunnel data of the memory access protocol over the physical layer of the particular interconnect protocol;
  send data to the physical layer to cause the physical layer to enter the low power state.

17. The apparatus of claim 16, further comprising one or more layers of the particular interconnect protocol and one or more layers of the memory access protocol.

18. The apparatus of claim 16, wherein the link layer of the particular interconnect protocol is disabled.

* * * * *